United States Patent
Scian et al.

(10) Patent No.: US 7,478,409 B2
(45) Date of Patent: Jan. 13, 2009

(54) SYSTEM AND METHOD FOR OBJECT ORIENTED INTERFACE CHECKING AND METHOD DISPATCHING

(75) Inventors: Anthony F. Scian, Waterloo (CA); David P. Yach, Waterloo (CA)

(73) Assignee: Research in Motion Limited, Waterloo (CA)

( * ) Notice: Subject to any disclaimer, the term of this patent is extended or adjusted under 35 U.S.C. 154(b) by 620 days.

(21) Appl. No.: 10/510,071

(22) PCT Filed: Mar. 28, 2003

(86) PCT No.: PCT/CA03/00453

§ 371 (c)(1), (2), (4) Date: Sep. 29, 2004

(87) PCT Pub. No.: WO03/083653

PCT Pub. Date: Oct. 9, 2003

(65) Prior Publication Data

US 2005/0132007 A1 Jun. 16, 2005

Related U.S. Application Data

(60) Provisional application No. 60/368,138, filed on Mar. 29, 2002.

(51) Int. Cl.
*G06F 9/44* (2006.01)
*G06F 9/46* (2006.01)

(52) U.S. Cl. ............. 719/328; 719/331; 719/332; 717/140; 717/162
(58) Field of Classification Search ............ 719/328, 719/331, 332; 717/140, 162
See application file for complete search history.

(56) References Cited

U.S. PATENT DOCUMENTS

| 5,889,995 A | 3/1999 | Segnan |
| 6,651,248 B1 * | 11/2003 | Alpern ............ 717/162 |
| 6,941,550 B1 * | 9/2005 | Sollich ............ 717/166 |
| 7,058,929 B2 * | 6/2006 | Charnell et al. ...... 717/135 |

FOREIGN PATENT DOCUMENTS

WO   WO 00/79386 A1   12/2000

OTHER PUBLICATIONS

"Fast Dispatch for Stock Hardware", John R. Rose, OOPSLA Proceedings, Sep. 25-30, 1988. Special Issue of SIGPLAN Notices, vol. 23, No. 11, Nov. 1988.

* cited by examiner

*Primary Examiner*—Li B Zhen
(74) *Attorney, Agent, or Firm*—Jones Day; Krishna K. Pathiyal; Robert C. Liang

(57) ABSTRACT

Method and system for interface checking and interface method dispatching for wireless devices. Relationships between classes and object-oriented interfaces are analyzed and certain properties are exploited for use in performing interface checking and/or interface method dispatching.

10 Claims, 25 Drawing Sheets

FIRST CONSTRAINT $$\begin{cases} \forall I_x, I_y, C_r \mid \\ C_r \text{ implements } I_x \wedge C_r \text{ implements } I_y \\ \Rightarrow \\ (\text{ordinal}_i(I_x) \diamond \text{ordinal}_i(I_y)) \\ \wedge \\ (\text{ordinal}_i(I_x), \text{ordinal}_i(I_y) \in \{0,1,\ldots,\max_i\}) \end{cases}$$ ← 115

| Interface ordinals | |
|---|---|
| ordinal | interfaces |
| 0 | $\{I_{a0}, I_{b0}, I_{c0}, \ldots, I_{d0}\}$ |
| 1 | $\{I_{a1}, I_{b1}, I_{c1}, \ldots, I_{d1}\}$ |
| ... | ... |
| $\text{ordinal}_i(I_x)$ | $I_x$ |
| ... | ... |
| $\text{ordinal}_i(I_y)$ | $I_y$ |
| ... | ... |
| $\max_i$ | $I_{dmaxi}$ |

FIG. 11

| cic(cr) | |
|---|---|
| ordinal | @ |
| 0 | null |
| 1 | null |
| ... | ... |
| $ordinal_i(I_x)$ | $@I_x$ |
| ... | ... |
| $ordinal_i(I_y)$ | $@I_y$ |
| ... | ... |
| $max_i$ | null |

FIG. 14

SECOND CONSTRAINT $$\begin{cases} \forall C_r, I_x, I_y, m_w \in I_x, m_z \in I_y \mid \\ (C_r \text{ implements } I_x \wedge C_r \text{ implements } I_y) \\ \Rightarrow \\ (\text{ordinal}_m(m_w) \diamond \text{ordinal}_m(m_z)) \\ \wedge \\ (\text{ordinal}_m(m_w), \text{ordinal}_m(m_z)) \in \{0,1,...,\max_{mi}\}) \end{cases}$$ 135

| Method ordinals | |
|---|---|
| ordinal$_m$ | Method signatures |
| 0 | $\{m_{a0}, m_{b0}, m_{c0}, ..., m_{d0}\}$ |
| 1 | $\{m_{a1}, m_{b1}, m_{c1}, ..., m_{d1}\}$ |
| ... | ... |
| ordinal$_m(m_w)$ | $m_w$ |
| ... | ... |
| ordinal$_m(m_z)$ | $m_z$ |
| ... | ... |
| max$_m$ | $m_{d\,\max m}$ |

FIG. 16

| CD(ci) | |
|---|---|
| ordinal | @ |
| 0 | null |
| 1 | null |
| ... | ... |
| $ordinal_m(m_z)$ | $@m_z$ |
| ... | ... |
| $ordinal_m(m_w)$ | $@m_w$ |
| ... | ... |
| $max_{mi}$ | null |

SYSTEM AND METHOD FOR OBJECT ORIENTED INTERFACE CHECKING AND METHOD DISPATCHING

RELATED CASE

This application claims the benefit of and priority to U.S. provisional patent application Ser. No. 60/368,138, filed Mar. 29, 2002, the entire disclosure of which is incorporated herein by reference.

BACKGROUND

1. Technical Field

The present invention relates generally to wireless devices, and more particularly to handling software objects operating on a wireless device.

2. Description of the Related Art

FIG. 1 illustrates a set 10 of object-oriented classes. Each class 15 is typically compiled from source code into object code. A class 15 typically defines attributes and implements methods. A class 15 may also provide a constructor method for constructing objects that are instances of that particular class, which are said to be objects of that class type. Classes 10 may be related to one another via a class hierarchy, wherein a subclass is related to a parent class whereby the subclass may inherit attributes and/or methods from the parent class.

FIG. 2 illustrates a set 20 of object-oriented interfaces. Each interface 25 is typically compiled from source code into object code. An interface 25 typically defines method signatures. As was the case with classes, interfaces 20 may be related to one another via an interface hierarchy, wherein a sub-interface is related to a parent interface and whereby a sub-interface may inherit method signatures from a parent interface. However, interfaces 20 differ from classes in at least two respects. First, interfaces do not implement methods, but rather define method signatures. Second, interfaces do not provide object constructors, but rather are used to cast objects of a particular class type into a particular interface type to enforce the exclusive use of the methods implemented in the class and accessible to the object, whose method signatures are defined in the interface.

SUMMARY

In accordance with the teachings contained herein, a method and system are provided for interface checking and interface method dispatching on wireless devices. Relationships between classes and object-oriented interfaces are analyzed and certain properties are exploited for use in performing interface checking and/or interface method dispatching.

BRIEF DESCRIPTION OF THE DRAWINGS

FIG. 10 illustrates the first constraint of FIG. 9;

FIG. 11 illustrates a sample interface ordinal table;

FIG. 14 illustrates a sample CIC table, as can be provided by the method of FIG. 13;

FIG. 15 illustrates the second constraint of FIG. 9;

FIG. 16 illustrates a sample method ordinal table;

FIG. 18 illustrates a sample CID table, as can be provided by the method of FIG. 17;

DETAILED DESCRIPTION

Figure 1:
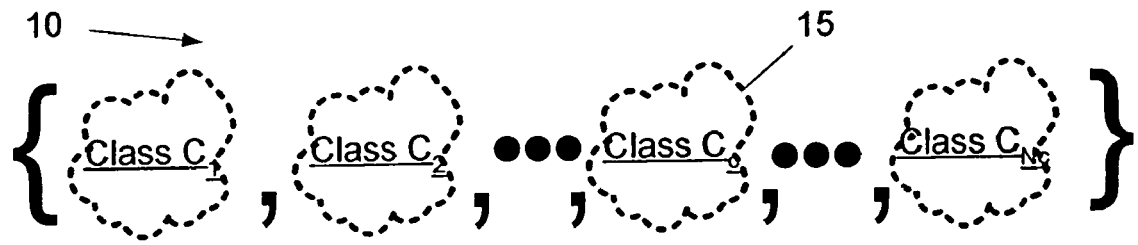
FIG. 1 illustrates a set of object-oriented classes.
Figure 2:
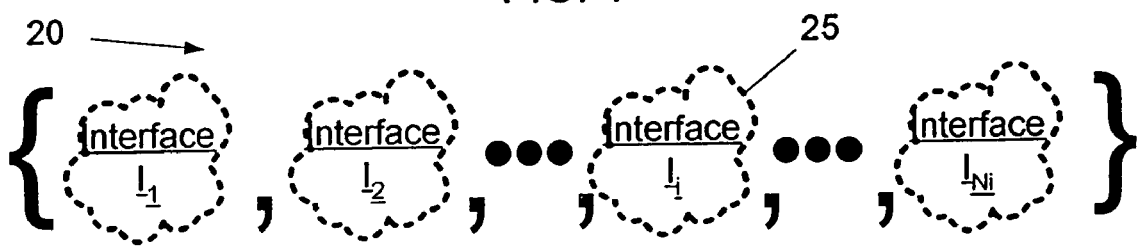
FIG. 2 illustrates a set of object-oriented interfaces.
Figure 3:
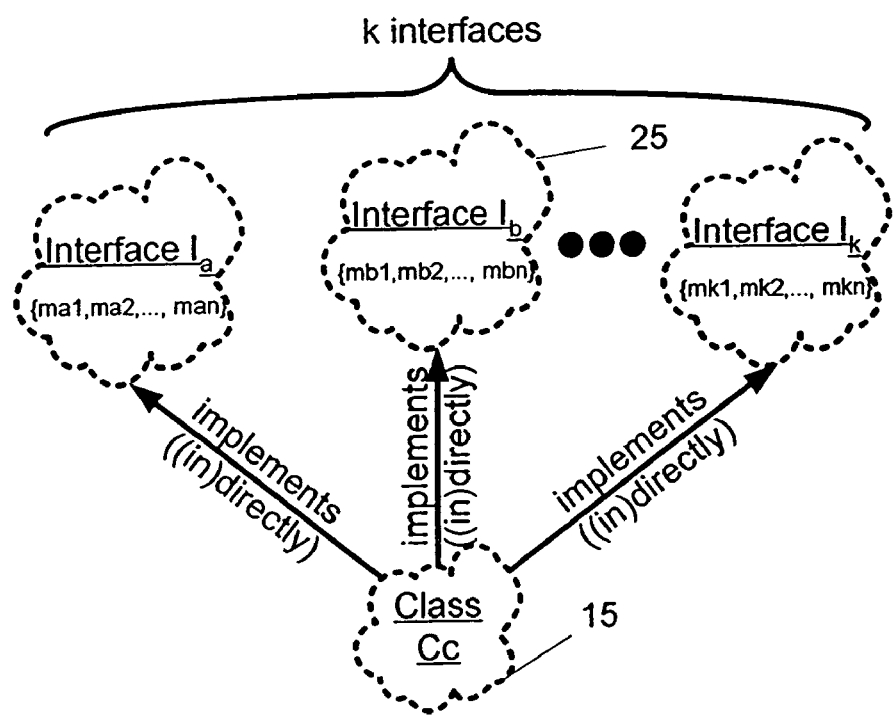
FIG. 3 illustrates the relationship between a typical class Cc and several interfaces.

FIG. 3 depicts relationships between a typical class Cc 15 and several interfaces 25. It was observed above that, in order for class Cc 15 to provide a constructor method for objects of type Cc, class Cc implements—either directly or indirectly—the methods whose signatures are defined in the interfaces 25 class Cc implements.

For the purposes of this description (and the appended claims), the term implements takes on a "deep" meaning as compared to the traditional "shallow" meaning, where "deep" and "shallow" refer to the traversal of the class and interface hierarchies to ascertain whether a class implements a method signature or an interface. However, it should be understood that certain situations may involve the term "implements" as having solely a "shallow" traversal while other situations may entail a wider meaning for the term "implements."

When considering the interfaces "shallowly" implemented by a class, only those interfaces explicitly declared as implemented by the class are considered. The concept of "shallow" implementation may be extended into a "deep" implementation, wherein the class and interface hierarchies are used to determine those method signatures and interfaces that are either directly (equivalent to "shallow") or indirectly implemented by the class.

The concept of direct vs. indirect implementation of method signatures and interfaces is described as follows. As used herein, a class implements directly any method signature or interface for which it explicitly declares and provides an implementation.

Furthermore, as used herein, a class implements indirectly via class hierarchy any method signature or interface it inherits from any of its super classes via the class hierarchy (i.e., from its parent class, or the parent class of its parent class, etc.; collectively known as the super classes of the class).

Further still, as used herein, a class implements indirectly via interface hierarchy any method signature or interface it inherits from any of its super interfaces via the class hierarchy (i.e., from its declared interfaces, from its super classes declared interfaces, or from any of the super interfaces of these declared interfaces).

In this description, whenever the term implements is used by itself, it will be understood that this is meant to include both direct and indirect implementation. Furthermore, whenever the term indirectly is used by itself, it will be understood that this is meant to include both indirectly via class hierarchy and indirectly via interface hierarchy.

Figure 4:
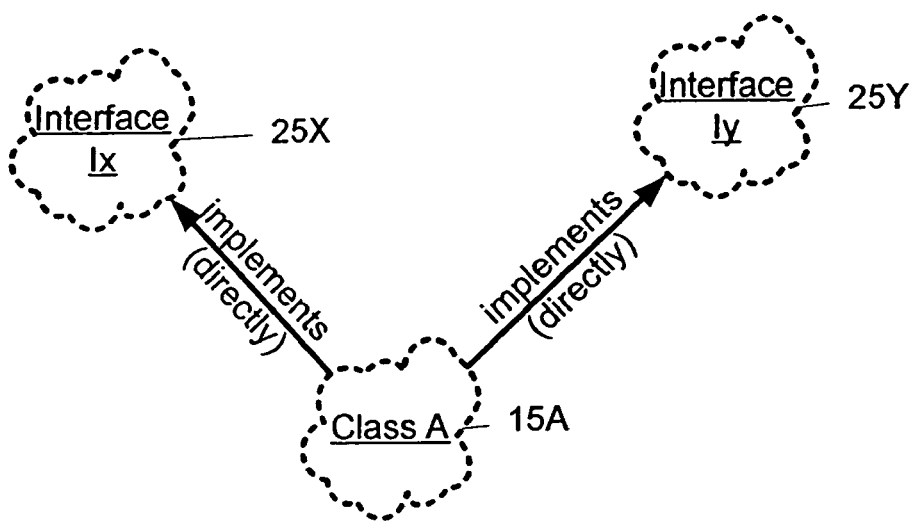
FIG. 4 illustrates a class that implements two interfaces directly.
Figure 5:
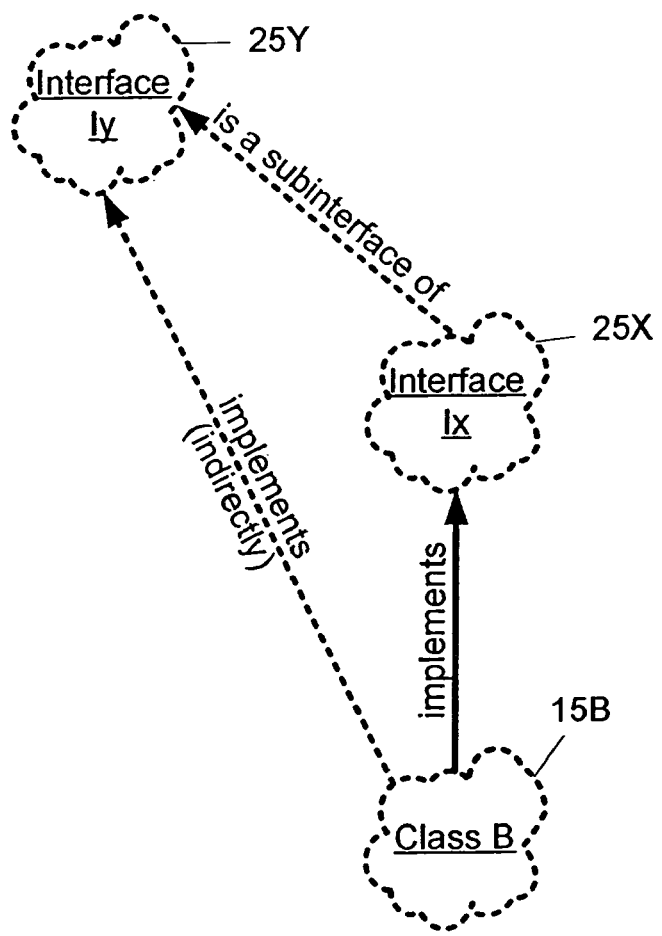
FIG. 5 illustrates a class that implements an interface indirectly via another interface.
Figure 6:
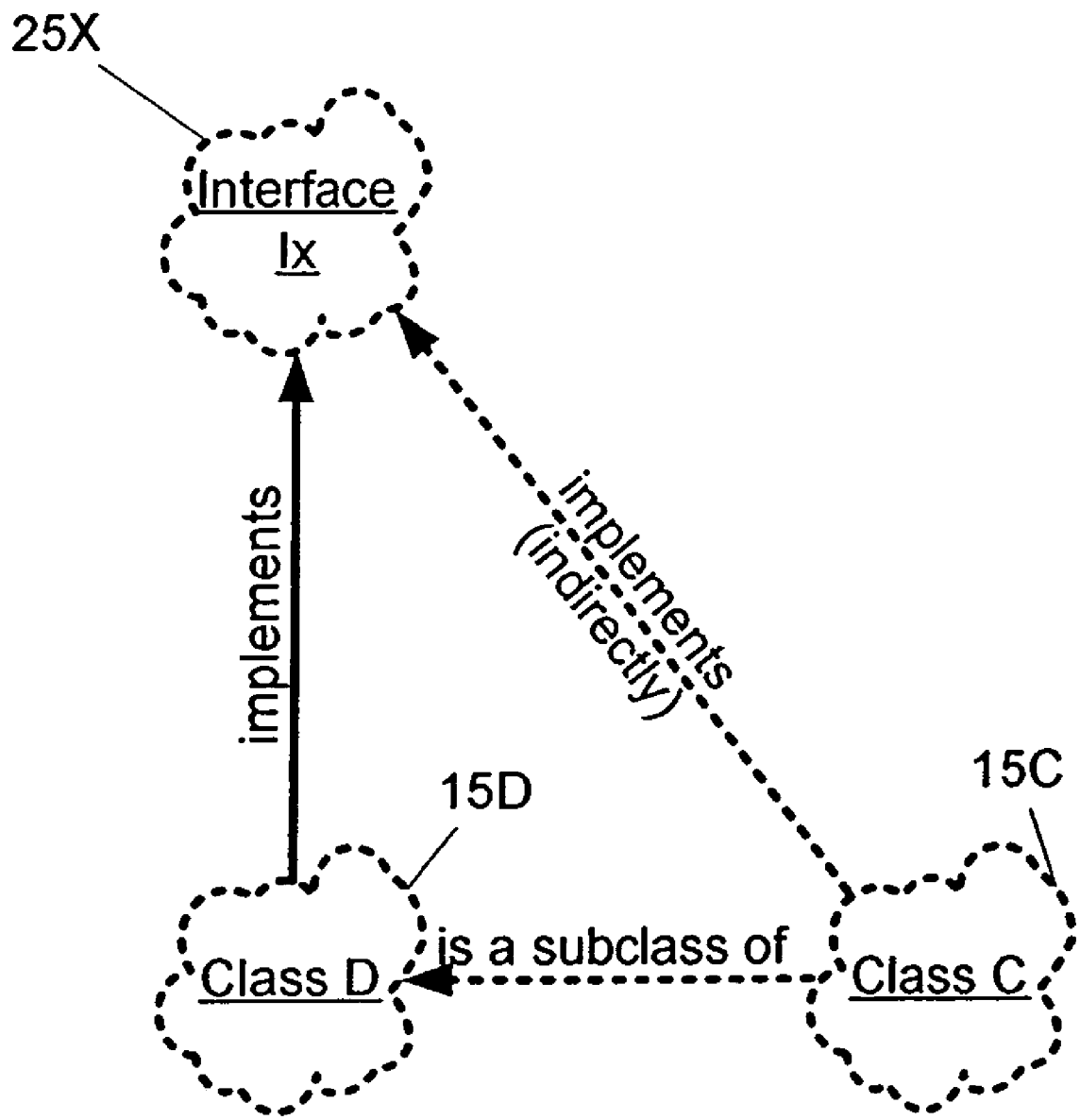
FIG. 6 illustrates a class that implements an interface indirectly via the class hierarchy.

FIGS. 4-6 illustrate, by example, cases of direct and indirect implementation of interfaces by classes. In particular, three cases wherein a class implements at an interface—either directly or indirectly—are illustrated. Rather than illustrating all possible combinations of direct and indirect implementation, the drawings illustrate the concept of considering the relationship between classes and interfaces, such as whether a class implements two interfaces simultaneously. As used in this description and in the appended claims, a class implements two interfaces simultaneously if the class can implement multiple interfaces and the class inherits, either directly or indirectly, from each of the two interfaces. The method considers this type of relationship between interfaces and classes and is described in greater detail in reference to FIGS. 8-22.

In the example of FIG. 4, class 15A implements two interfaces 25X, 25Y directly.

In the example of FIG. 5, a class 15B implements an interface 25Y indirectly via another interface 25X. Class 15B, like class 15A in FIG. 4, implements directly interface 25X—as illustrated by the solid arrow connecting class 15B to interface 25X. However, unlike class 15A in FIG. 4, class 15B implements indirectly (via the interface hierarchy) interface 25Y. As illustrated, interface 25X is a sub-interface of 25Y, i.e., 25Y is either the parent interface of $I_x$ or of any of the parent interfaces of 25Y in the interface hierarchy.

Finally, in the example of FIG. 6, class 15C implements an interface 25X indirectly via the class hierarchy, i.e., via another class 15D.

Figure 7:
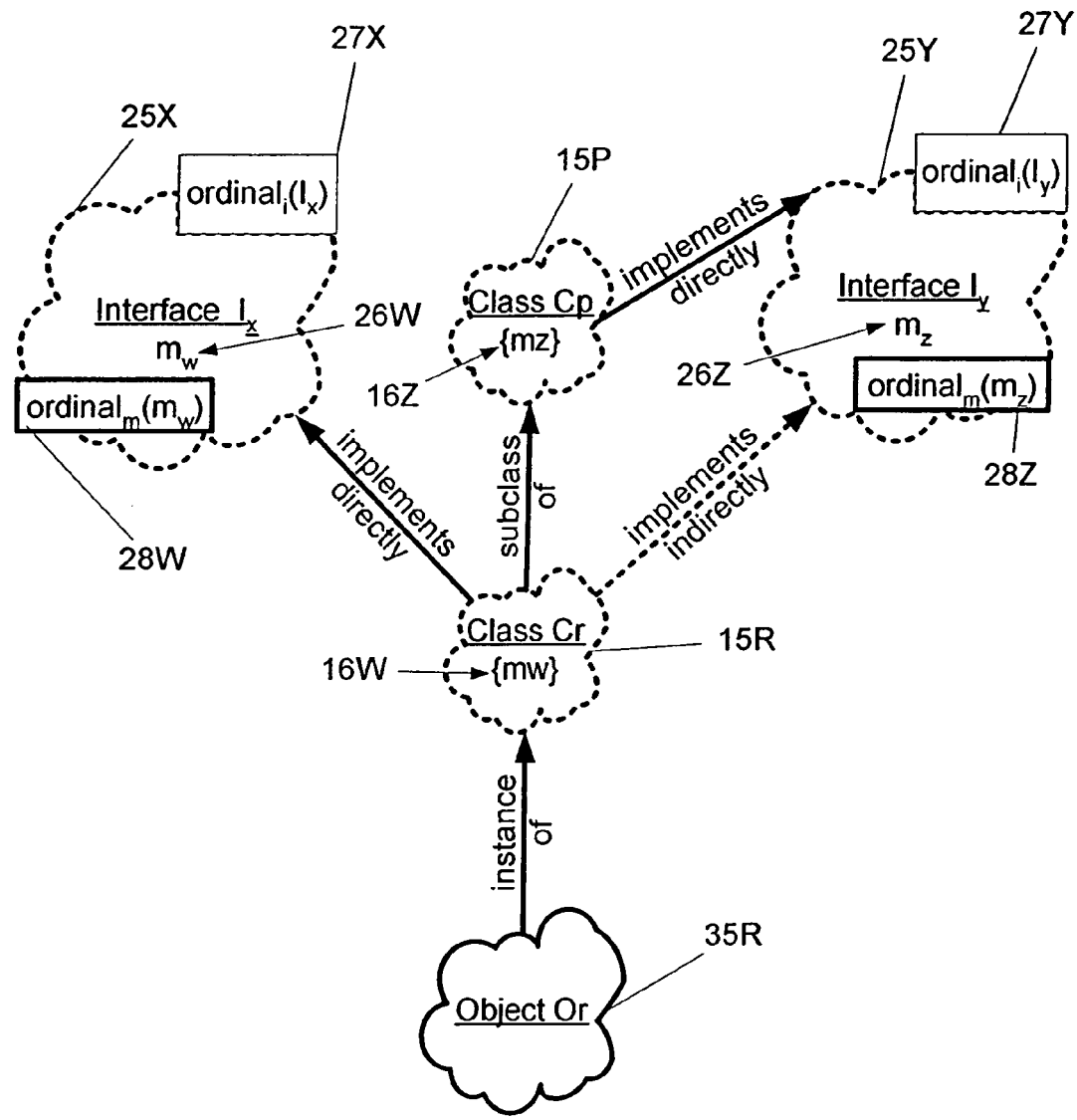
FIG. 7 illustrates an example set of classes and a set of interfaces.

With respect to FIG. 7, a specific set of classes 15P, 15R and a set of interfaces 25X, 25Y will be used, as an example, to illustrate the embodiments of the method and system illustrated in the remaining figures. As shown, class 15P implements interface 25Y directly. Furthermore, class 15R implements interface 25X directly. Class 15R is a subclass of 15P and thereby implements interface 25Y indirectly. Interface 25X contains method signature 26W, which is implemented by class 15R in method implementation 16W. Similarly, interface 25Y contains method signature 26Z, which is implemented by class 15P in method implementation 16Z.

Figure 22:
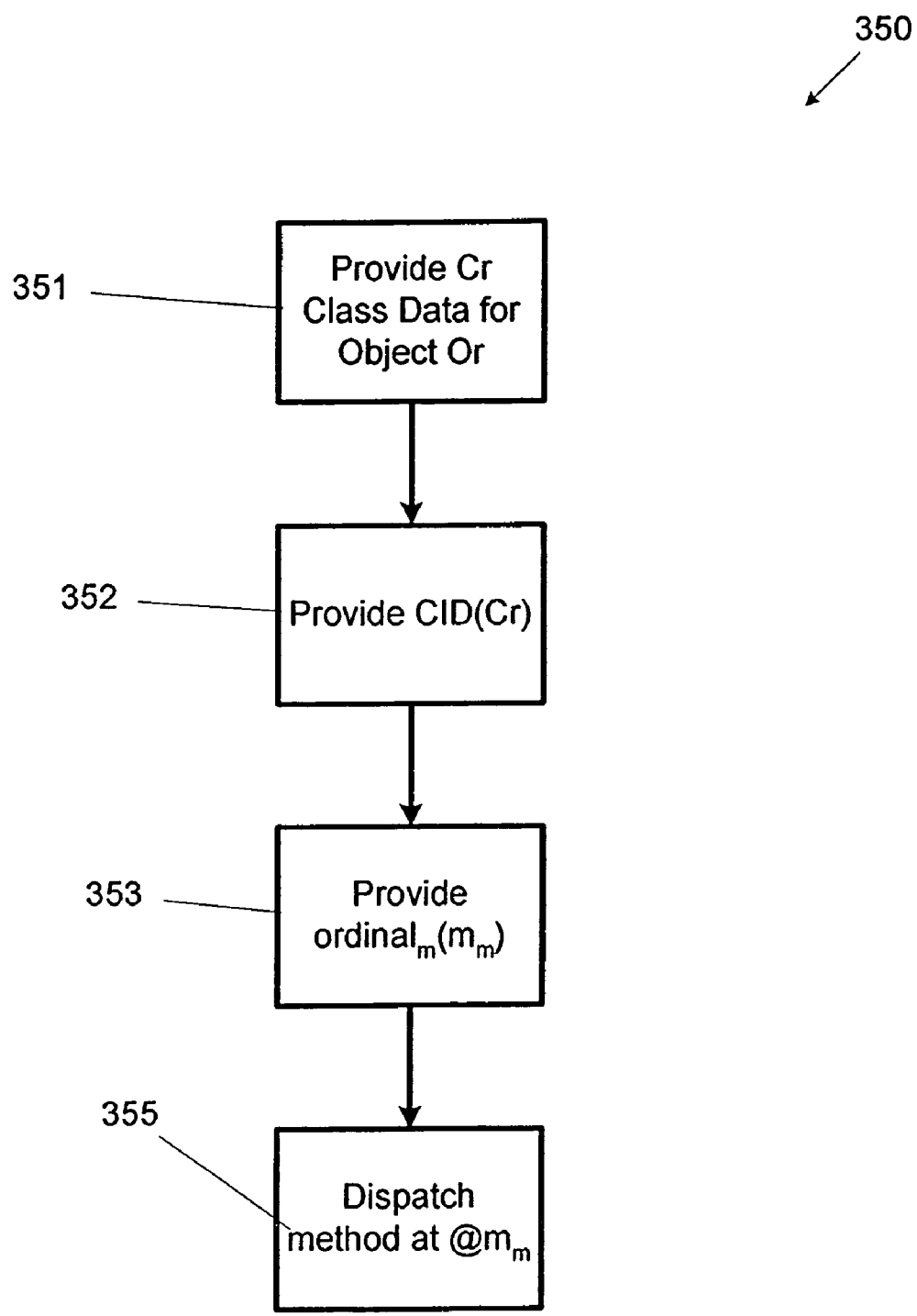
FIG. 22 illustrates an example embodiment of a direct dispatch method.
Figure 27:
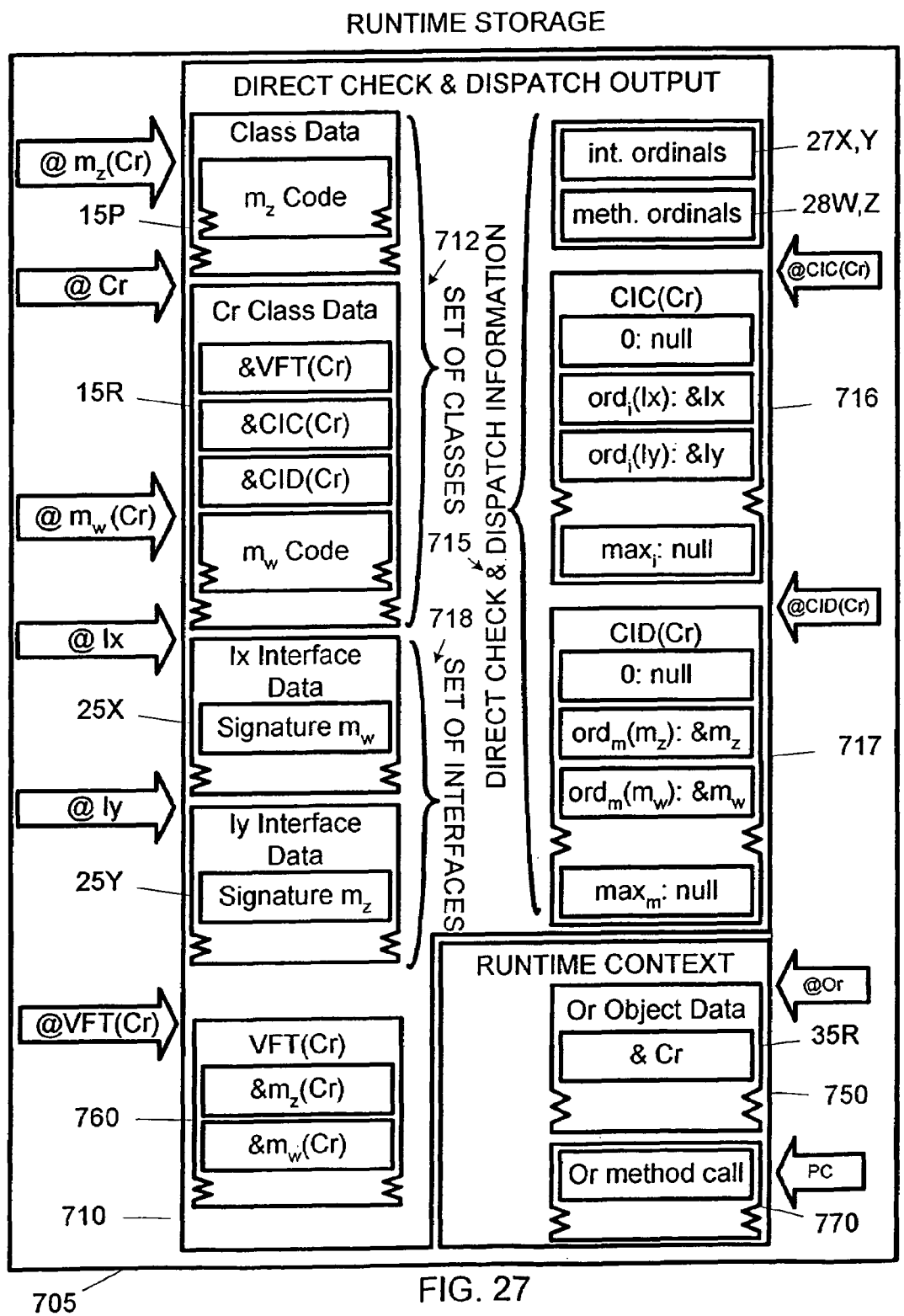
FIG. 27 illustrates in greater detail the exemplary runtime storage of FIG. 26.

Also shown in FIG. 7, is example runtime object 35R, an instance of class 15R, which will be further described in reference to the runtime portions of the system and method, in FIGS. 22 and 27.

With respect to the ternary relationship between class 15R and interfaces 25X and 25Y, class 15R implements simultaneously interfaces 25X and 25Y. In an assignment method, interface ordinal numbers 27X and 27Y are assigned to interfaces 25X and 25Y respectively. Furthermore, method ordinal numbers 28W and 28Z are assigned to method signatures 26M and 26Z respectively.

The ordinal assignments to the interfaces and interface methods are stored in direct check and dispatch information data structures. During operation of a runtime device, the device may use the data structures to directly check if a runtime object can be cast into a particular type of interface. If so, then the device may further use the data structures to facilitate a direct dispatch of the desired method(s) associated with the checked interface. Generation of check and dispatch information is described in greater detail in reference to FIGS. 8-22.

Figure 8:
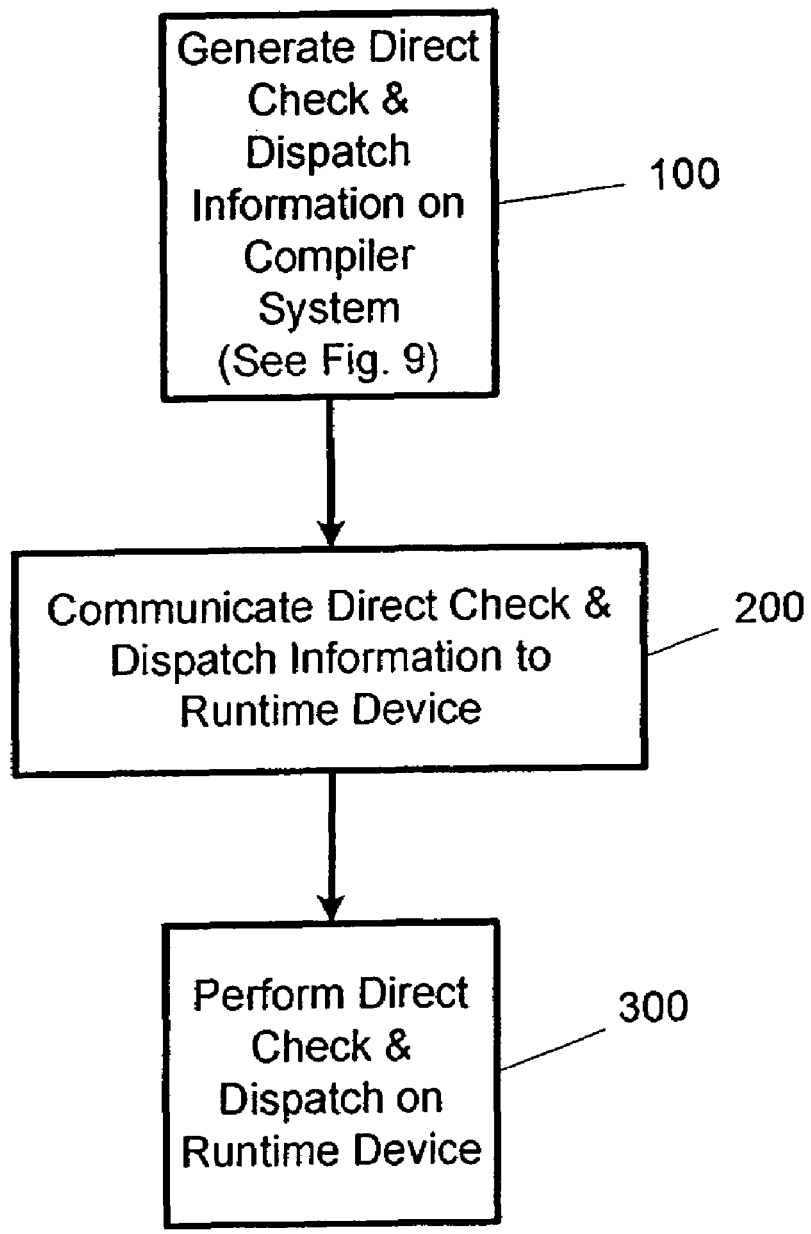
FIG. 8 illustrates a flowchart of an example embodiment of the method.

With reference to FIG. 8, a flowchart of one embodiment of the method, by way of example, is illustrated. Three steps 100, 200, and 300 are illustrated.

In the first step 100, check and dispatch information is generated on a compiler system. This step is described in greater detail with reference to FIGS. 9-18. Furthermore, an exemplary embodiment of the compiler system is described in further detail with reference to FIG. 23 wherein the compiler system is illustrated as a part of a larger system, and with reference to FIG. 24 wherein an exemplary compiler system is illustrated. In an alternative embodiment, it is contemplated that this step may be carried out on the runtime device.

In the second step 200, the check and dispatch information generated in step 100 is communicated to a runtime device. This step is described in greater detail in reference to FIG. 19. Check and dispatch information may be prepared, stored, and communicated to a runtime device, via media which is described with reference to FIG. 23 wherein the media is illustrated as a part of a larger system, and with reference to FIG. 25 wherein an exemplary media is illustrated. In an alternative embodiment, it is contemplated that this step may be carried out on the runtime device.

In the third and final step 300, the check and dispatch information generated in step 100, and communicated in step 200, is used to perform, first a direct check step and then a direct dispatch step on a runtime device. This step is further illustrated in greater detail in FIG. 20, wherein direct check and direct dispatch steps are also illustrated. The direct check step is further detailed with reference to FIG. 21, whereas the direct dispatch step is further detailed with reference to FIG. 22. The runtime device is illustrated as a part of a larger system in FIG. 23, and an exemplary runtime device, a wireless device, is illustrated in greater detail in FIGS. 26 and 27.

Although not expressly shown in the drawings, some portions of step 100 can be carried out on the runtime device. In the case where all portions of step 100 are carried out on the runtime device, then step 200 may need not be carried out as the runtime device and compiler system can be coterminous.

Figure 9:
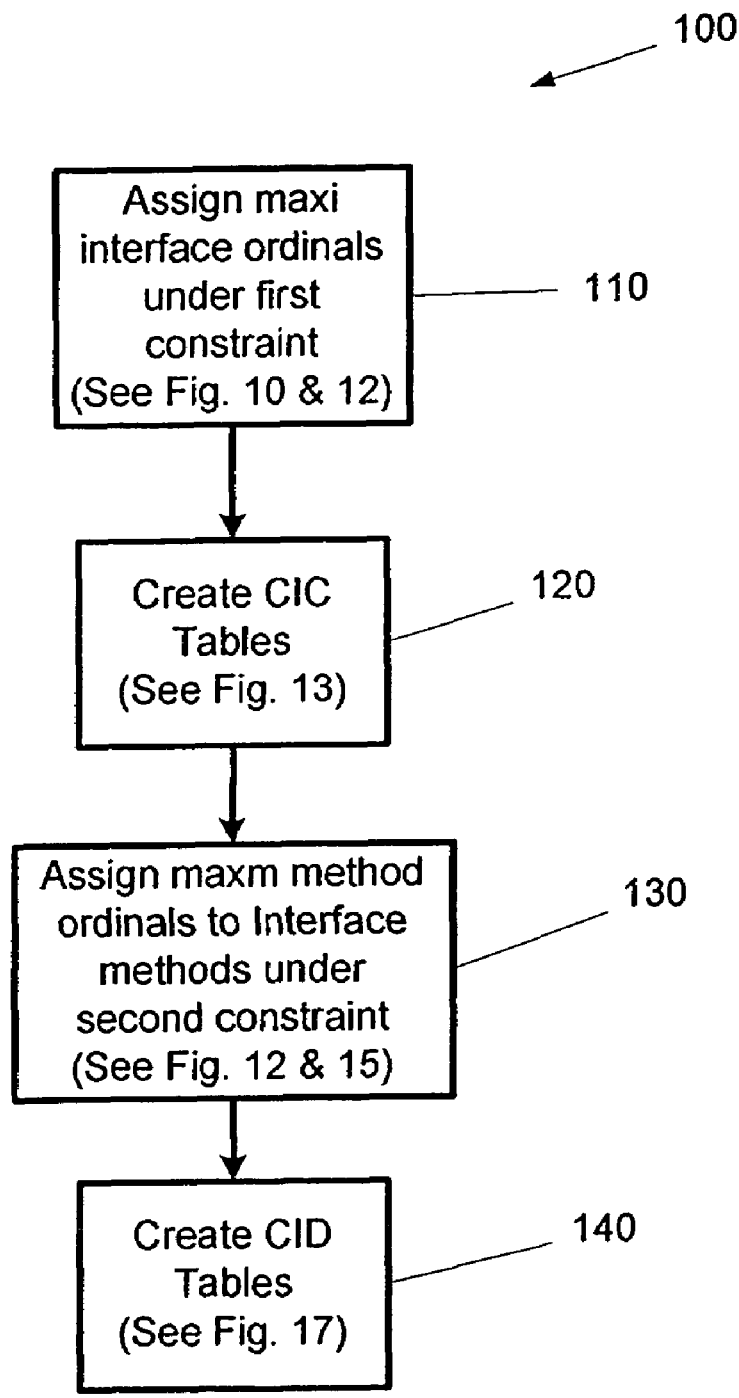
FIG. 9 illustrates an exemplary embodiment of a method to carry out step 100 of FIG. 8.

With reference to FIG. 9, an exemplary embodiment of a method to carry out step 100 of FIG. 8 is illustrated.

At step 110, interface ordinals are assigned to interfaces, while optimizing a first constraint. The constraint is illustrated by the expression 115 of FIG. 10, which states that interface ordinals are to be assigned to enforce the rule that two interface ordinals (such as for example with reference to FIG. 7 interface ordinal 27X and ordinal 27Y) are different if there exists a class in the system that directly or indirectly implements both interfaces at the same time, such as for example with reference to FIG. 7 class 15R. At the end of step 110, $max_i$ interface ordinals will have been assigned to the interfaces of the system.

A sample interface ordinal table 117 is illustrated in FIG. 11. Note that more than one interface may share the same interface ordinal in order to minimize the value of $max_i$, the number of interface ordinals. In the sample interface ordinal table 117 of FIG. 11, additional entries are shown to illustrate the cases where many more classes and interfaces are in the system, not only those shown in the example of FIG. 7. Step 110 can be accomplished using any number of techniques for optimizing NP-complete problems. One such technique 300 is illustrated in FIG. 12, which will be described next.

Figure 12:
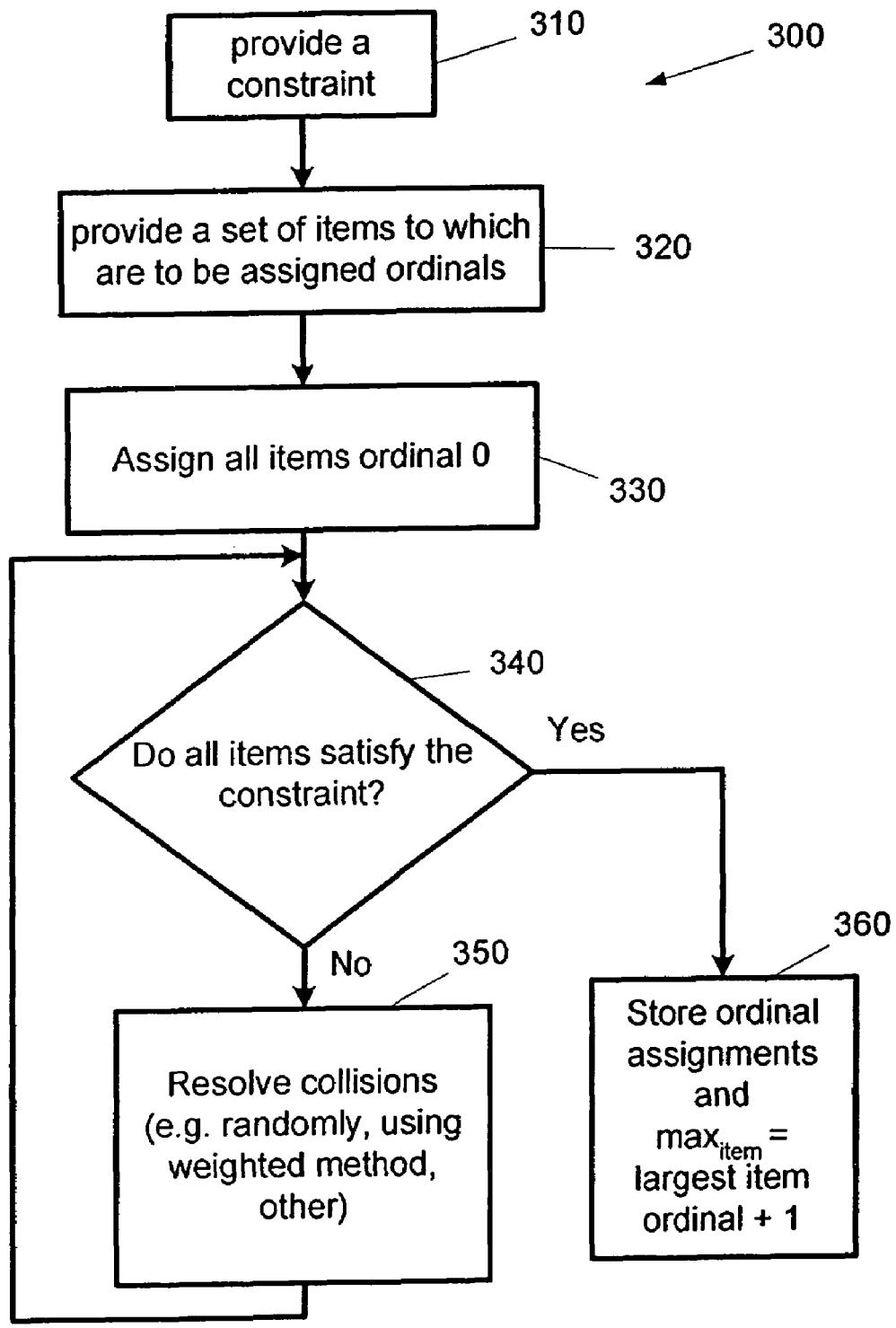
FIG. 12 illustrates an exemplary technique for optimizing the NP-complete steps 110 and 130 of FIG. 10.

With reference to FIG. 12, a constraint is provided at step 310, and at step 320 a set of items to be assigned ordinals is also provided. Items are assigned the same ordinal 0 at step 330. At step 340, the items are tested for satisfying the constraint. If the constraint is not satisfied (such as due to at least two items not satisfying the constraint and thereby resulting in a "collision" of their ordinal assignments), step 350 resolves this by using any one of a number of known techniques such as randomly choosing or using a weighted method. For example, by randomly choosing one of the interfaces involved in a conflict to have its ordinal changed (e.g., by adding a value of one to it) the conflict is thus resolved. Processing returns to step 340.

If the constraint is satisfied as determined at step 340, then step 360 ensues. At step 360, the ordinal assignments and the maximum number of ordinals in the system are stored.

With reference back to FIG. 9, having described step 110, the next step 120 of creating class interface check (CIC) tables is described next in greater detail with reference to FIG. 13. At step 121, all classes in the system are processed in turn through steps 122 through 127. At step 122, a CIC table is created with $max_i$ null references for the class Cc currently being processed. At step 123, all interfaces in the system are processed in turn through steps 125 through 126. At step 125, the class Cc currently being processed is tested for directly or indirectly implementing the interface $I_i$ currently being processed. If class Cc implements interface $I_i$, then at step 125, the reference corresponding to the interface ordinal of interface $I_i$ in the CIC table of class Cc is set to point to the interface $I_i$. At step 126, if all interfaces have been processed, then step 127 ensues, if not then the next interface to process is selected, and processing continues at step 124. At step 127, if all classes have been processed, then the method ends, if not then the next class to process is selected, and processing continues at step 122.

Figure 13:
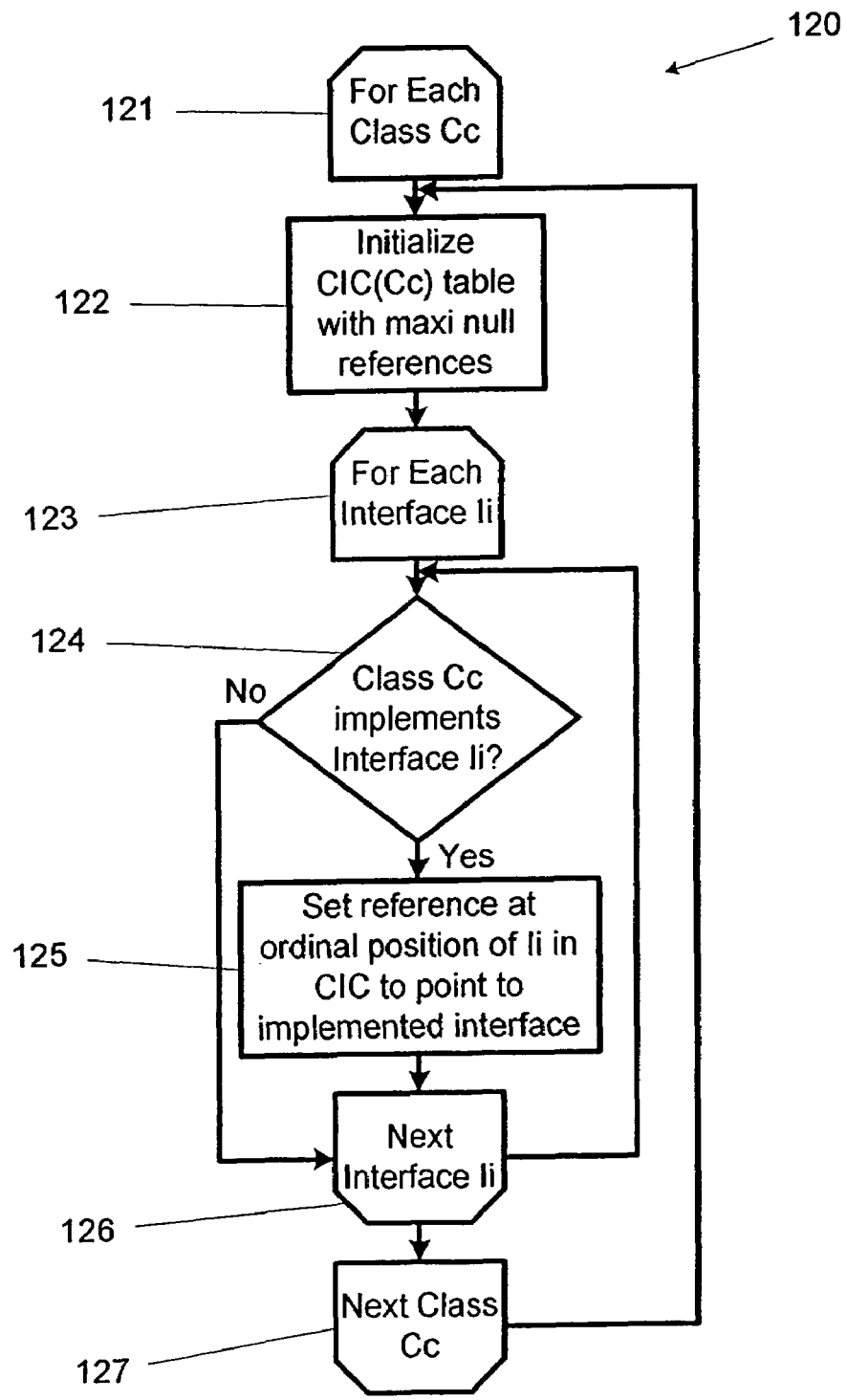
FIG. 13 illustrates a method to carry out step 120 of FIG. 9 to provide a class interface check (CIC) table.

A sample CIC table 128, as can be provided by the method of FIG. 13, is illustrated in FIG. 14. Note that optionally only entries that correspond to interface ordinals of methods that are implemented by the particular class have non-null entries. For example with reference to FIG. 7, the CIC table corresponding to class Cr would have non-null entries at ordinals 27X and 27Y corresponding to interfaces 25X and 25Y respectively. In the sample CIC table 128 of FIG. 14, additional entries are shown to illustrate the cases where many more classes and interfaces are in the system, not only those shown in the example of FIG. 7.

With reference back to FIG. 9, having described step 120, the next step 130 of assigning method ordinals to interface method signatures, while optimizing a second constraint, is described next in greater detail with reference to FIGS. 15, 16 and FIG. 12. The constraint is illustrated by the expression 135 of FIG. 15, which states that method ordinals are to be assigned to enforce the rule that two method ordinals (such as for example with reference to FIG. 7 method ordinal 28W and ordinal 28Z) are different if there exists a class in the system that directly or indirectly implements both methods at the same time, such as for example with reference to FIG. 7 class 15R. At the end of step 130, $max_m$ method ordinals will have been assigned to the interface method signatures of the system.

A sample method ordinal table 137 is illustrated in FIG. 16. It is noted that more than one method may share the same method ordinal in order to minimize the value of $max_m$, the number of method ordinals. In the sample method ordinal table 135 of FIG. 16, additional entries are shown to illustrate the cases where many more classes and interfaces are in the system, not only those shown in the example of FIG. 7. As was the case with step 110, step 130 can be accomplished using any number of techniques for optimizing NP-complete problems. One such technique 300 is illustrated in FIG. 12, which was already described above.

With reference back to FIG. 9, having described step 130, the next step 140 of creating class interface dispatch (CID) tables is described next in greater detail with reference to FIG. 17. At step 141, all classes in the system are processed in turn through steps 142 through 147. At step 142, a CID table is created with $max_m$ null references for the class Cc currently being processed. At step 143, all interfaces in the system are processed in turn through steps 145 through 146. At step 145, the class Cc currently being processed is tested for directly or indirectly implementing the interface $I_i$ currently being processed, and may use the CIC table. If class Cc implements interface $I_i$, then at step 145, the reference corresponding to the method ordinal of each method signature in interface $I_i$ in the CID table of class Cc is set to point to the implementation of the method signature of Class Cc. This step may involve the use of the virtual function table for class Cc and a deep traversal of the class hierarchy of class Cc. At step 146, if all interfaces have been processed, then step 147 ensues, if not then the next interface to process is selected, and processing continues at step 144. At step 147, if all classes have been processed, then the method ends, if not then the next class to process is selected, and processing continues at step 142. After all classes have been processed, step 800 may follow in order to compact the tables. This step 800 is an optional improvement. A method of carrying out step 800 is discussed in greater detail with reference to FIGS. 28-30.

Figure 17:
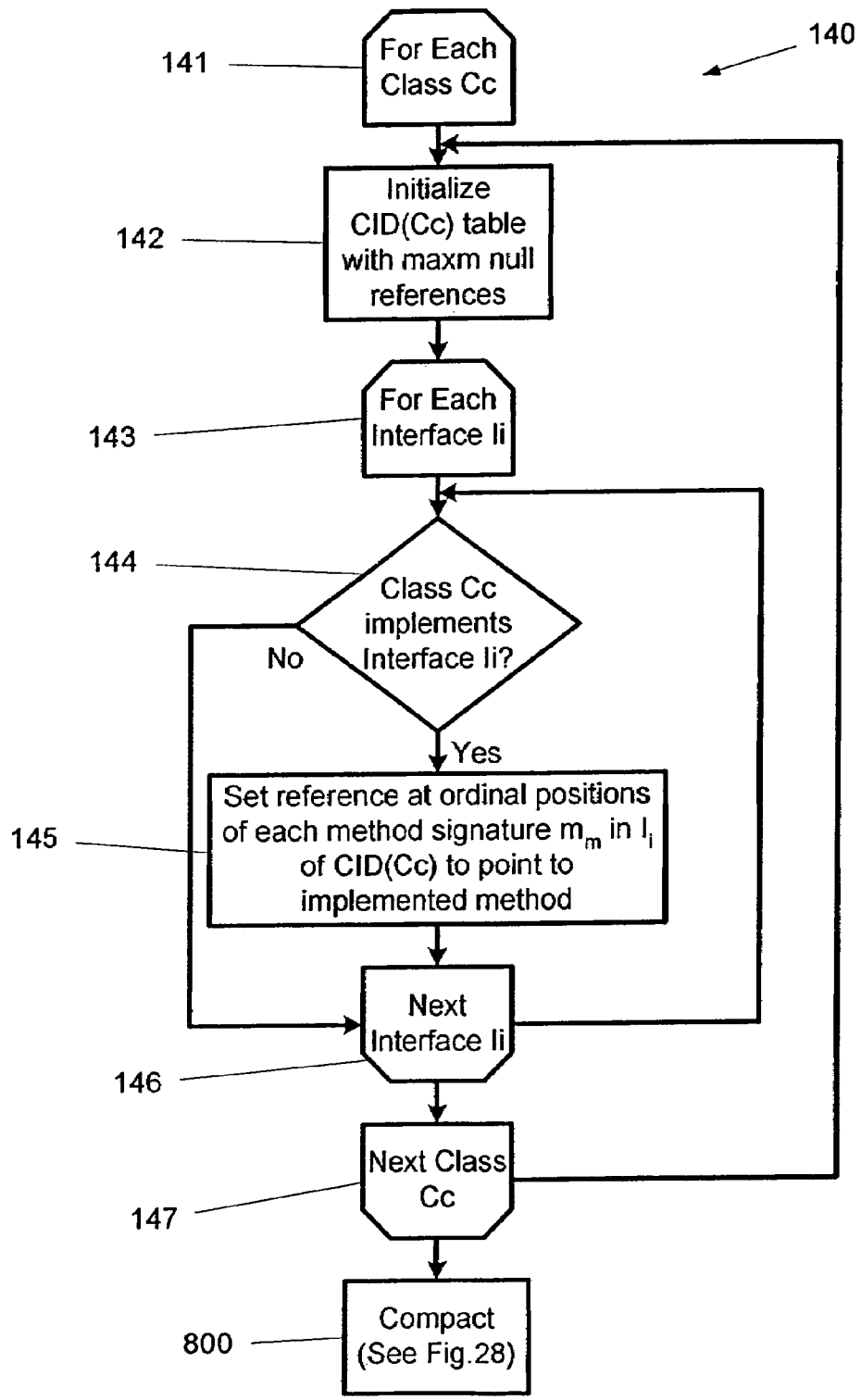
FIG. 17 illustrates a method of carrying out step 140 of FIG. 9 to provide a class interface dispatch (CID) table.

A sample CID table 148, as can be provided by the method of FIG. 17, is illustrated in FIG. 18. Note that optionally only entries that correspond to method ordinals of methods that are implemented by the particular class have non-null entries. For example with reference to FIG. 7, the CID table corresponding to class Cr would have non-null entries at ordinals 28W and 28Z corresponding to method signatures 26W and 26Z respectively. In the sample CID table 148 of FIG. 18, additional entries are shown to illustrate the cases where many more classes and interfaces are in the system, not only those shown in the example of FIG. 7.

With reference back to FIG. 8, having described step 100, the next step 200 of communicating direct check and dispatch information to a runtime device is described next in greater detail with reference to FIG. 19.

Figure 19:
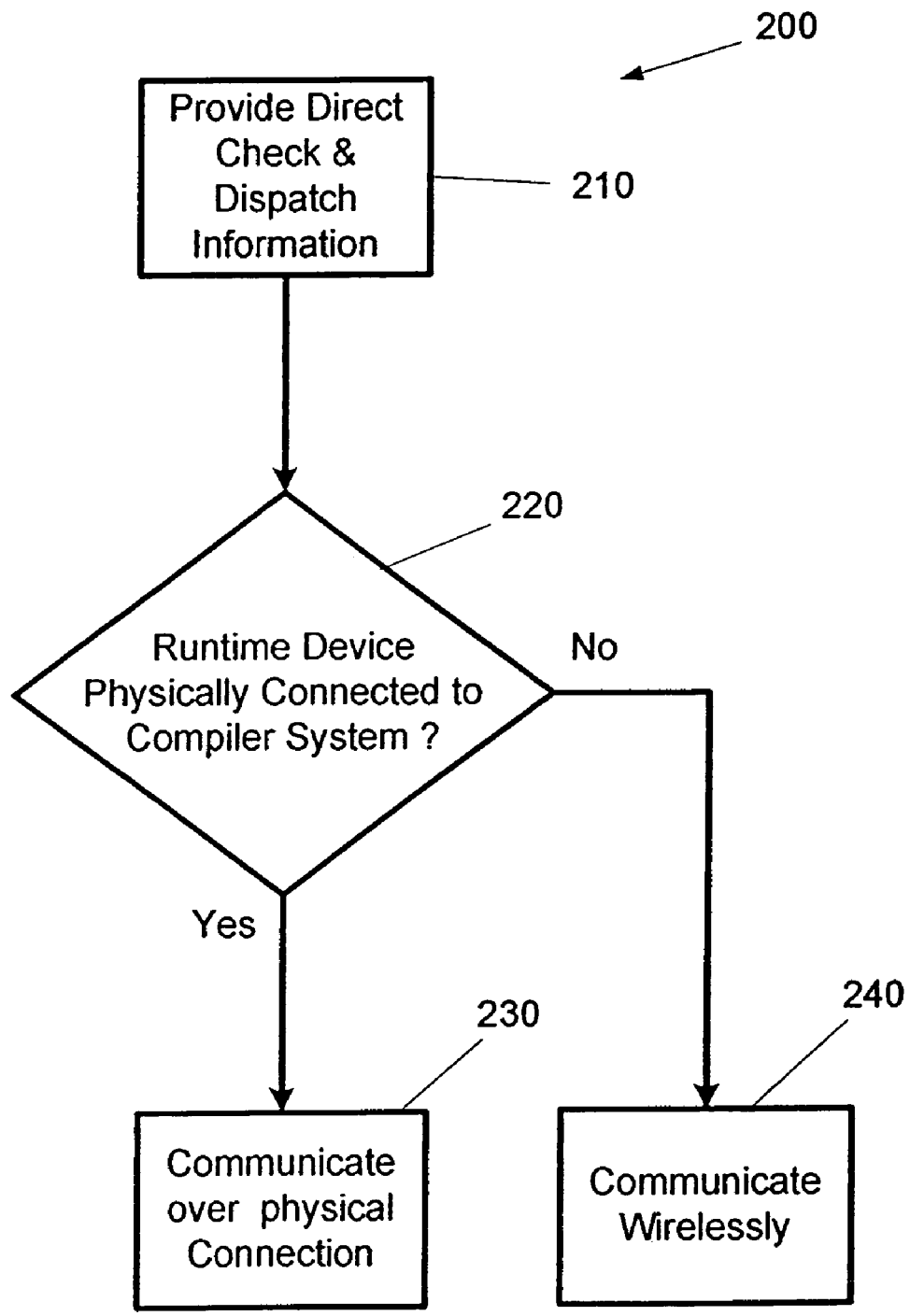
FIG. 19 illustrates a method to carry out the step 200 of FIG. 8 to communicate direct check and dispatch information to a runtime device.

With reference to FIG. 19, at step 210 direct check and dispatch information is provided, which was generated at step 100. Direct check information includes interface ordinal assignments and CIC tables. Direct dispatch information includes method ordinal assignments and CID tables. Direct check and dispatch information may be provided by itself, or optionally bundled with auxiliary information such as the set of classes and interfaces, as part of a larger direct check and dispatch output.

At step 220, it is determined whether the compiler system that provided the direct check and dispatch information at step 210, is physically connected to a runtime device. An example of physical connection is if he runtime device is electrically connected to the compiler system, such as for instance sitting in a cradle connected to the compiler system via a serial interface or fiber. An example of a non-physical connection is envisaged when the runtime device is a wireless communication device.

At step 230, if the runtime device was found to be connected physically to the compiler system at step 220, the direct check and dispatch information is communicated to the runtime device by the compiler system over the physical connection.

At step 240, if the runtime device was not found to be connected physically to the compiler system at step 220, the direct check and dispatch information is communicated to the runtime device wirelessly, if the runtime device is a wireless device.

With reference back to FIG. 8, having described step 200, the next step 300 of performing direct check and dispatch on a runtime device is described next in greater detail with reference to FIG. 20.

Figure 20:
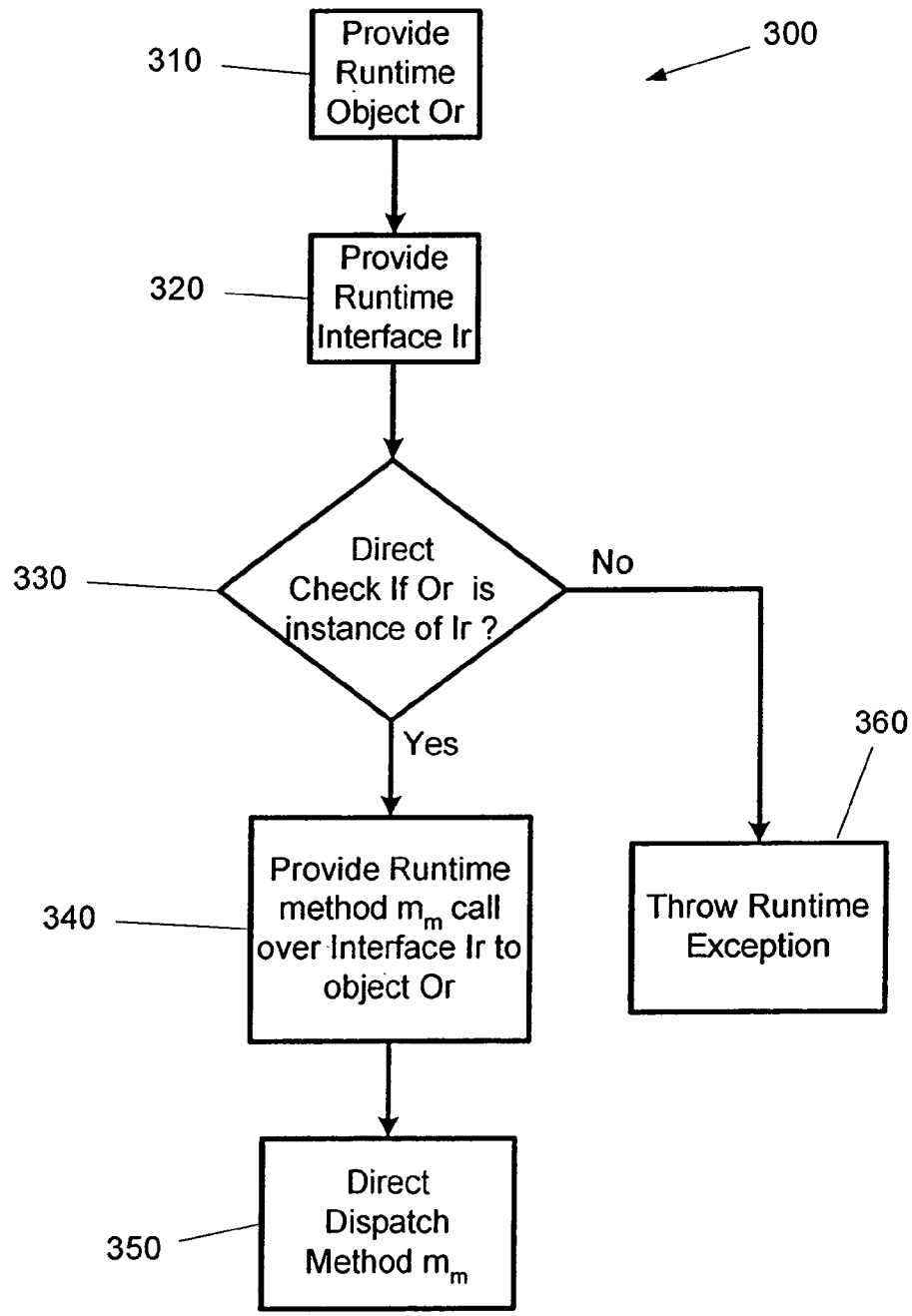
FIG. 20 illustrates a method to carry out the step 300 of FIG. 8 to perform a direct check and dispatch on a runtime device.

With reference to FIG. 20, at step 310 a runtime object Or is provided, such as for example, with reference to the example of FIG. 7, runtime object 35R.

At step 320, an interface Ir is provided, such as for example, with reference to the example of FIG. 7, interface 25Y.

Figure 21:
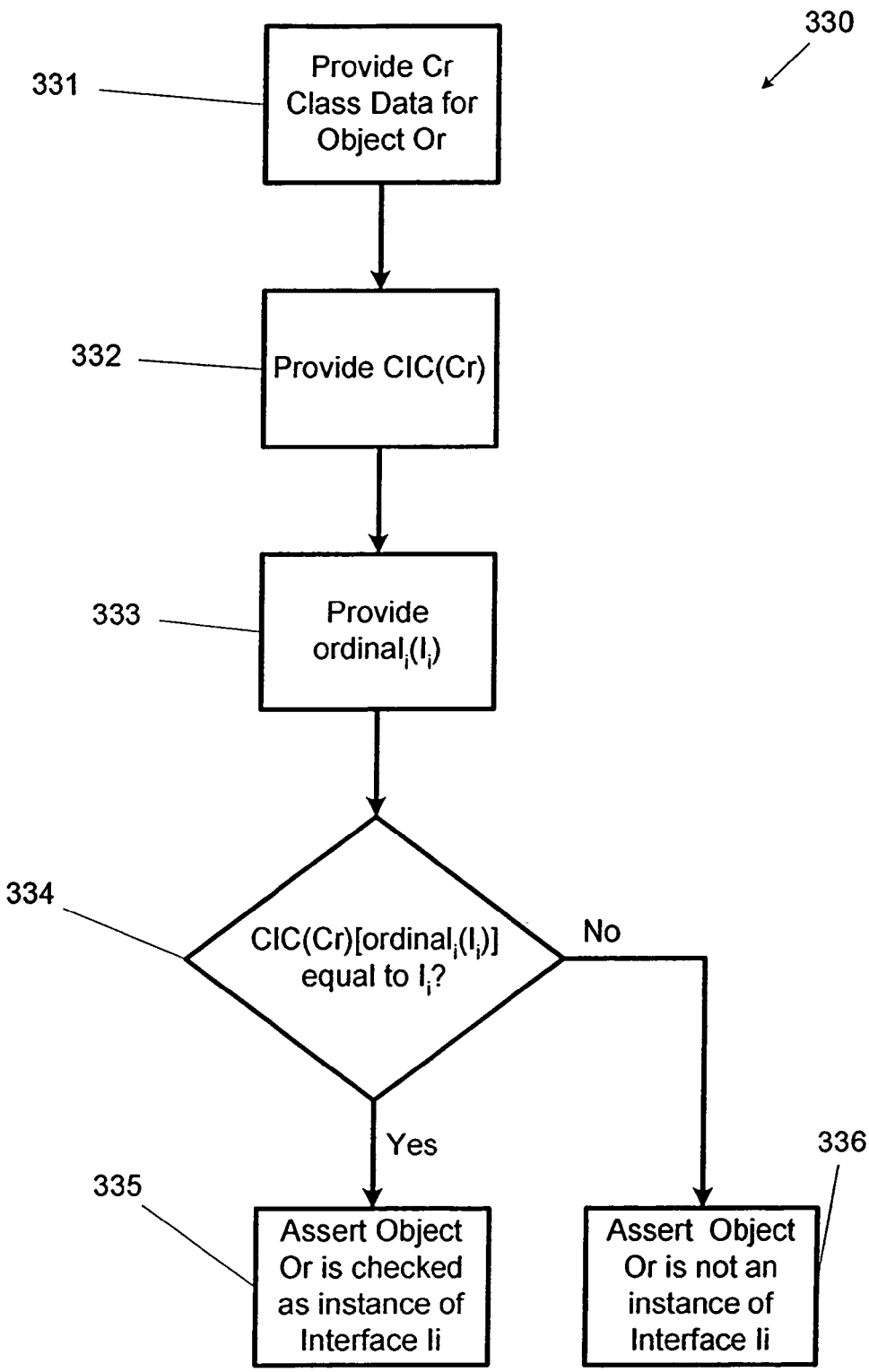
FIG. 21 illustrates an example embodiment of a direct interface check method.

At step 330, a direct interface check is performed to verify if runtime object Or can be cast into the type of interface Ir. An example embodiment of a method to carry out this step is illustrated in FIG. 21, and will be described immediately after FIG. 20. If the object Or passes the check, then steps 340 and 350 ensue.

At step 340, a method signature $m_m$ is provided, selected from the method signatures found in interface Ir for the purpose of calling the implementation of method $m_m$ provided via object Or.

At step 350, a direct dispatch is performed of method $m_m$ via interface Ir of object Or. An example embodiment of a method to carry out this step is illustrated in FIG. 22, and will be described after FIG. 21.

However, if the object Or does not pass the check at step 330, then at step 360 a runtime exception is thrown.

With reference to FIG. 21, an example embodiment of a direct interface check method is described next. At step 331, the class data Cr for object Or is provided. This class data allows the runtime system to determine what class type provided the constructor for the Or object.

At step 332, knowing the class Cr of object Or, the CIC(Cr) table for Cr found in the direct check and dispatch information, is provided.

At step 333, the interface ordinal $ordinali(I_i)$ of interface $I_i$ is provided, for example by looking it up in the interface ordinal table of the direct check and dispatch information.

At step 334, the entry in the CIC(Cr) table corresponding to the interface ordinal $ordinali(I_i)$ of interface $I_i$ is compared to a reference to interface $I_i$ to perform the direct check. If the reference is equal to $I_i$, then Object Or can be cast into the type corresponding to interface $I_i$, and step 335 ensues wherein object Or is asserted as an instance of interface $I_i$. However, if the reference is not equal to $I_i$, then object Or cannot be cast into the type corresponding to interface $I_i$, and wherein object Or is asserted as not being an instance of interface $I_i$.

With reference back to FIG. 20, having described step 330 performing a direct check with reference to FIG. 21, the step 350 of performing direct dispatch is described next in greater detail with reference to FIG. 22.

With reference to FIG. 22, an example embodiment of a direct dispatch method is described next. At step 351, the class data Cr for object Or is provided. This class data allows the runtime system to determine what class type provided the constructor for the Or object.

At step 352, knowing the class Cr of object Or, the CID(Cr) table for Cr found in the direct check and dispatch information, is provided.

At step 353, the method ordinal $ordinal_m(m_m)$ of interface method $m_m$ is provided, for example by looking it up in the method ordinal table of the direct check and dispatch information.

At step 355, method mm is directly dispatched.

Having described the three steps of the method of FIG. 8, a system suitable to cooperate with an embodiment of the method will be described next with reference to FIGS. 23-27.

Figure 23:
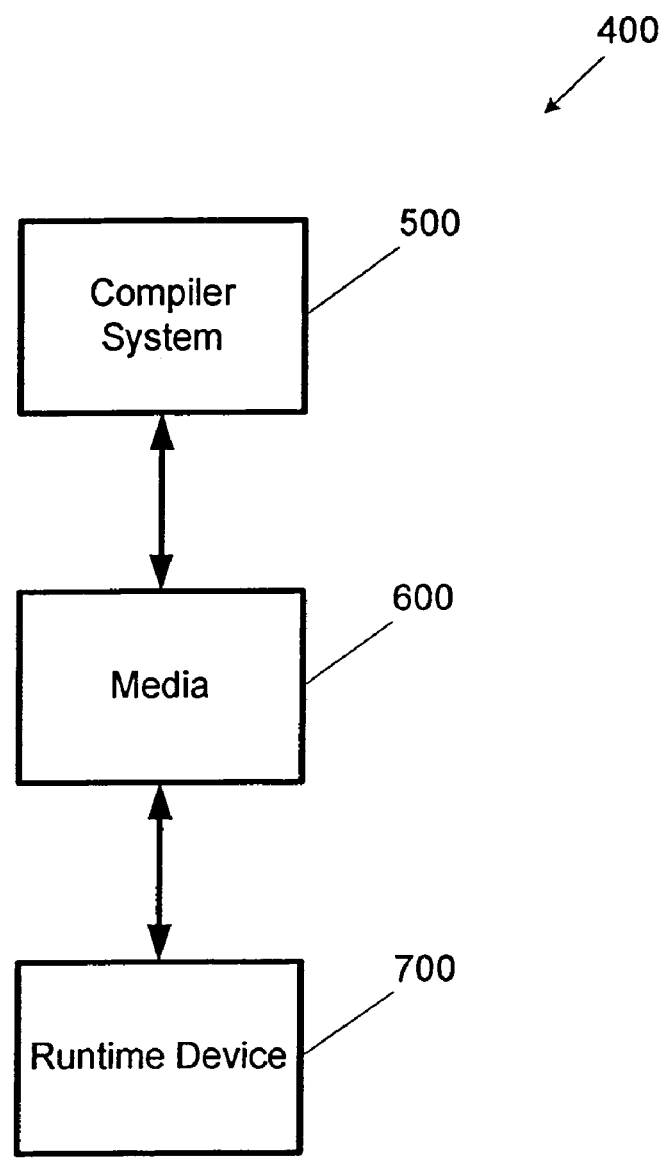
FIG. 23 illustrates a direct check and dispatch system.

With reference to FIG. 23, a direct check and dispatch system 400 is illustrated. The direct check and dispatch system 400 includes a compiler system 500, media 600, and a runtime system 700. The compiler system 500 generates the direct check and dispatch information. The media 600 is used to prepare or store the direct check and dispatch information for communication to the runtime device 700. The runtime device 700 performs the direct check and dispatch using the direct check and dispatch information. Examples of each of these components of system 400 will be described next in reference to FIGS. 24-27.

Figure 24:
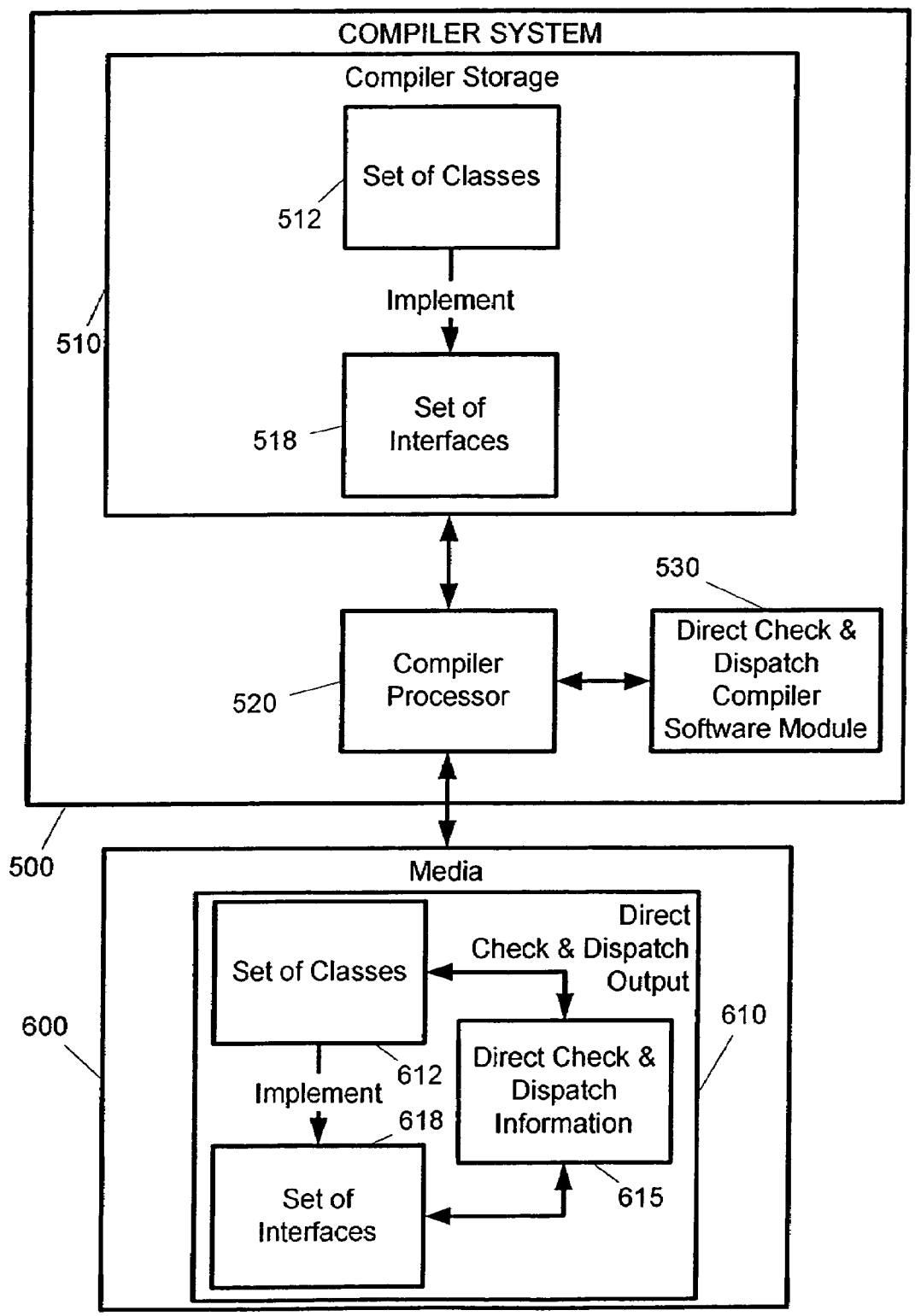
FIG. 24 illustrates in greater detail a compiler system and media of FIG. 23.

With reference to FIG. 24, the compiler system 500 and media 600 of FIG. 23 are illustrated in greater detail.

The compiler system 500 may include compiler storage 510 wherein can be stored a representation of a set of classes 512 and a representation of a set of interfaces 518. The representations 512, 518 may be in source code form, object form, a reference to a network source, or any other representation that allows processor 520 to provide the set of interfaces and classes to the direct check and dispatch compiler software module 530. The direct check and dispatch compiler software module 530 may embody the method steps 100 and 200 of FIG. 8.

In some situations, the direct check and dispatch compiler software module 530 generates CIC and CID tables wherein interface and method ordinals are respectively assigned to interfaces and interface methods such that a first and second constraint are substantially satisfied. The constraints are used along with a technique for optimizing NP-complete ordinal assignment problems (as described above) during the generation of the direct check and dispatch information. The check and dispatch information is later used by a runtime device, such as for performing a direct interface check method wherein the CIC table is directly consulted using the interface ordinal to perform the check. The runtime device can also perform a direct dispatch method wherein the CID table is directly consulted using the method ordinal to perform the dispatch.

The generated check and dispatch information 615 may be stored on media 600. Although not necessary, the media 600 may also include as part of the direct check and dispatch output 610 not only the direct check and dispatch information 615, but optionally a representation of the corresponding set of classes 612 and a representation of the set of interfaces 618. The representations 612 and 618 need not be the same as the corresponding representations 512 and 518 found in the compiler system. The media 600 itself is intended to encompass both storage devices, such as RAM, flash, and disks, and communication media such as network connections and data streams.

Figure 25:
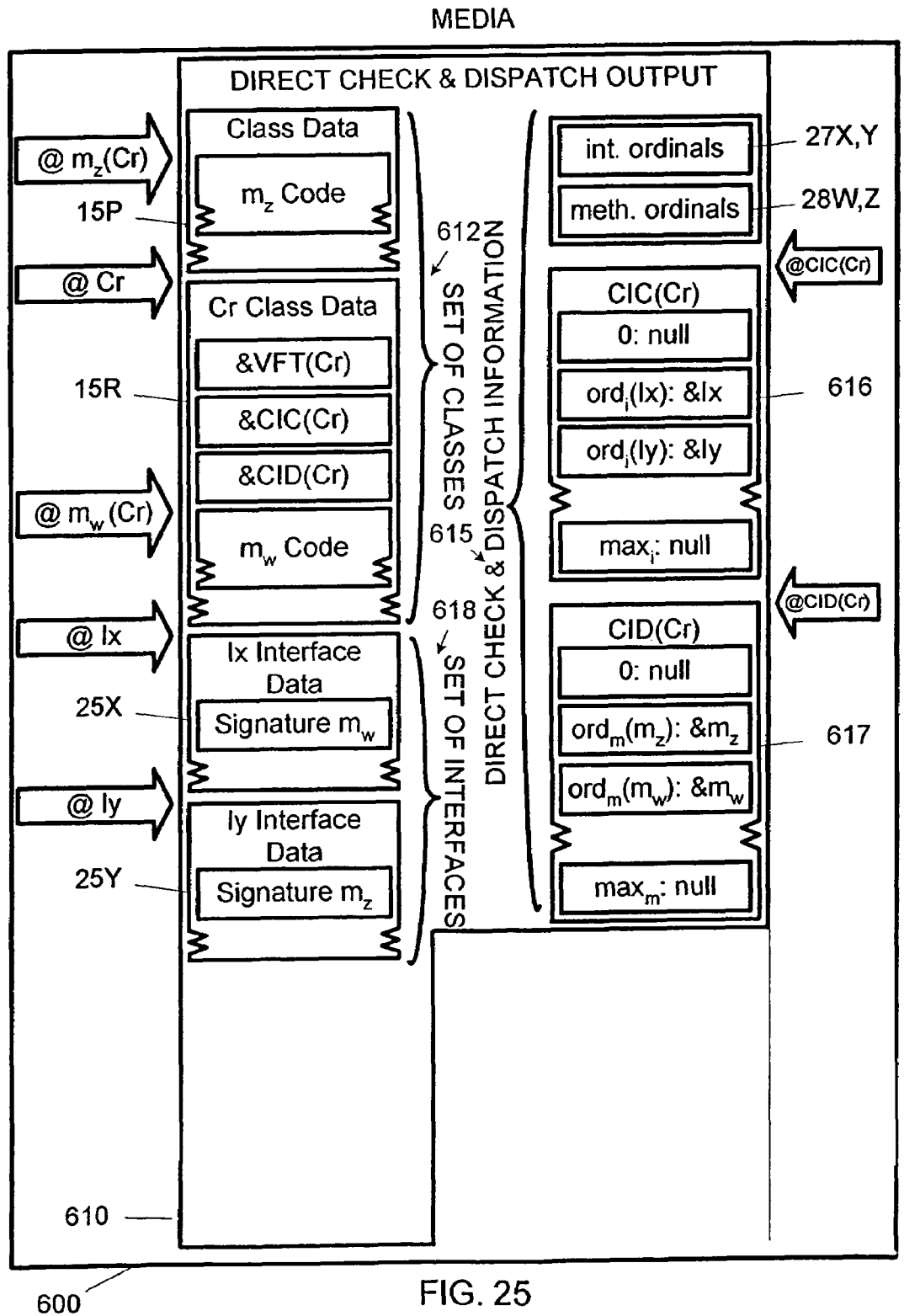
FIG. 25 illustrates an example storage media of FIGS. 23 and 24 in further detail.

With reference to FIG. 25, an exemplary storage media 600, such as flash, is illustrated. For a logical view of some of the same elements, see FIG. 7. Direct check and dispatch output 610 includes a set of classes 612, a set of interfaces 618, and direct check and dispatch information 615. The set of classes illustrated includes Cr class data 15R and other class data 15P (see FIG. 7 for a logical view). The set of interfaces 618 includes $I_x$ 25X interface data, and 25Y interface data. Direct check and dispatch information 615 includes CIC tables 616 and CID tables 617, as well as interface and method ordinals 27X, 27Y and 28W, 28Z respectively. Only one CIC table CIC(Cr) and one CID table CID(Cr), both related to class Cr 15R, are illustrated. CIC(Cr) table 616 has non-null entries at interface ordinal positions $ord_i(I_x)$ and $ord_i(I_y)$ corresponding to interface ordinals of interfaces $I_x$ 25X and $I_y$ 25Y respectively. CID(Cr) table 617 has non-null entries at method ordinal positions $ord_m(m_w)$ and $ord_m(m_z)$ corresponding to method ordinals of interface methods $m_w$ and $m_z$ of interfaces $I_y$ 25Y and $I_x$ 25X respectively.

Figure 26:
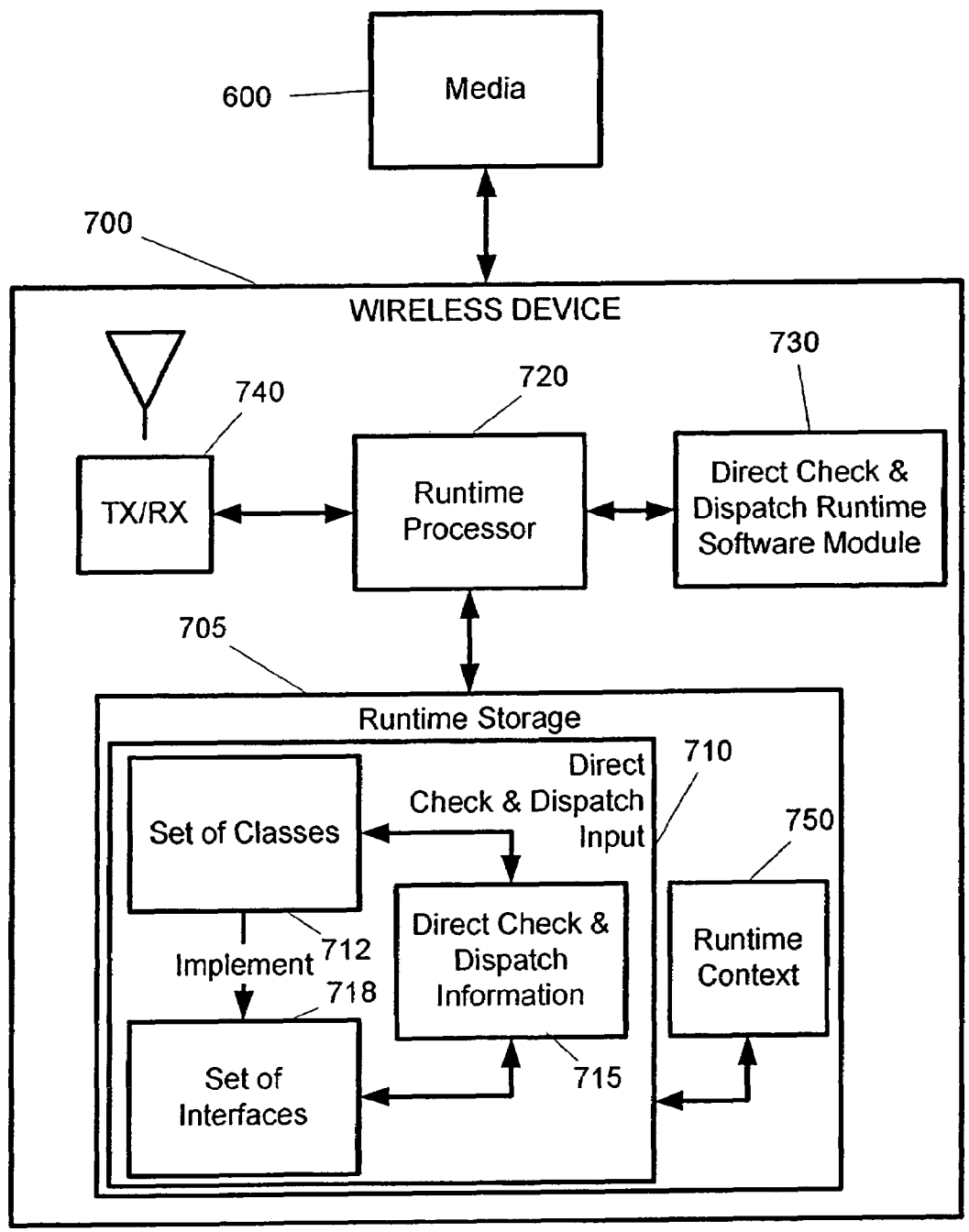
FIG. 26 illustrates an example runtime device.

With reference to FIG. 26, an exemplary runtime device, which happens to be a wireless device 700, is illustrated. Runtime device 700 includes runtime storage 705 to receive and store a representation of direct check and dispatch information 715 via media 600. The direct check and dispatch information 715 need not be in the same representation 615 as found in media 600, or as found in compiler system 500. As illustrated, the direct check and dispatch information 715 is part of direct check and dispatch input 710, which optionally includes representations 712 and 718 of the set of classes and interfaces, respectively. In addition to the direct check and dispatch information, runtime storage also includes a runtime context 750, which is used in conjunction with the direct check and dispatch information 615. The runtime context 750 may include any particular objects for which the direct check is performed, as well as any particular method calls on objects for which the direct dispatch is performed.

Runtime processor 720 may execute the direct check and dispatch runtime software module 730 and provides direct check and dispatch information 715 to module 730 for the purpose of performing the direct check and dispatch method. It should be understood that the runtime software module may be implemented as a single program or a set of programs (e.g., a module to perform the direct check and another module to perform the direct dispatch). Runtime software module 730 may embody the step 300 of the method of FIG. 8.

Also shown is transceiver 740 that allows runtime device 700 to communicate with compiler system 500 over wireless media 600.

With reference to FIG. 27, exemplary runtime storage 705 is illustrated. See FIG. 7 for a logical view of some of the same elements. Direct check and dispatch output 710 includes a set of classes 712, a set of interfaces 718, and direct check and dispatch information 715. The set of classes illustrated includes Cr class data 15R and other class data 15P (see FIG. 7 for a logical view). The set of interfaces 718 includes $I_x$ 25X interface data and 25Y interface data. Direct check and dispatch information 715 includes CIC tables 716 and CID tables 717, as well as interface and method ordinals 27X, 27Y and 28W, 28Z respectively. Only one CIC table CIC(Cr) and one CID table CID(Cr), both related to class Cr 15R, are illustrated. CIC(Cr) table 716 has non-null entries at interface ordinal positions $ord_i(I_x)$ and $ord_i(I_y)$ corresponding to interface ordinals of interfaces $I_x$ 25X and $I_y$ 25Y respectively. CID(Cr) table 717 has non-null entries at method ordinal positions $ord_m(m_w)$ and $ord_m(m_z)$ corresponding to method ordinals of interface methods $m_w$ and $m_z$ of interfaces $I_y$ 25Y and $I_x$ 25X respectively. Also illustrated is runtime context 750 which includes Or object data 35R (see FIG. 7) and an Or method call 770. The Or method call 770 is illustrated at the position of the program counter PC for the runtime context 750 as this condition could be used as a trigger to invoke the direct check and dispatch method of FIG. 20 wherein at step 340 a runtime method call is provided. Also shown is virtual function table 760 which includes the addresses of the two interface methods of the example of FIG. 7, $m_z(Cr)$ and $m_w(Cr)$ each specified by interfaces 25Y and 25X respectively, and implemented by class data 15P and 15R respectively.

Figure 29:
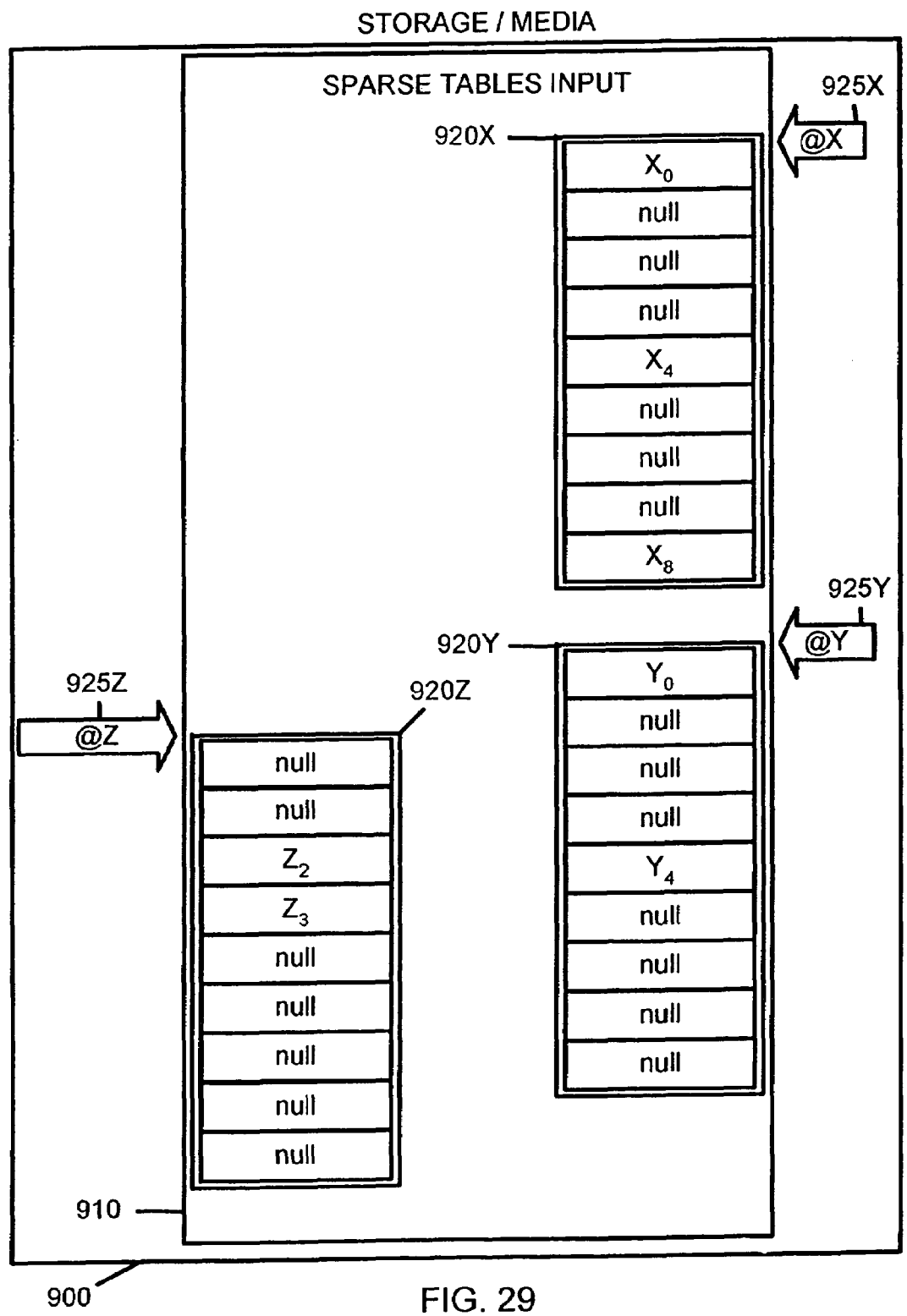
FIG. 29 illustrates sparse tables.
Figure 30:
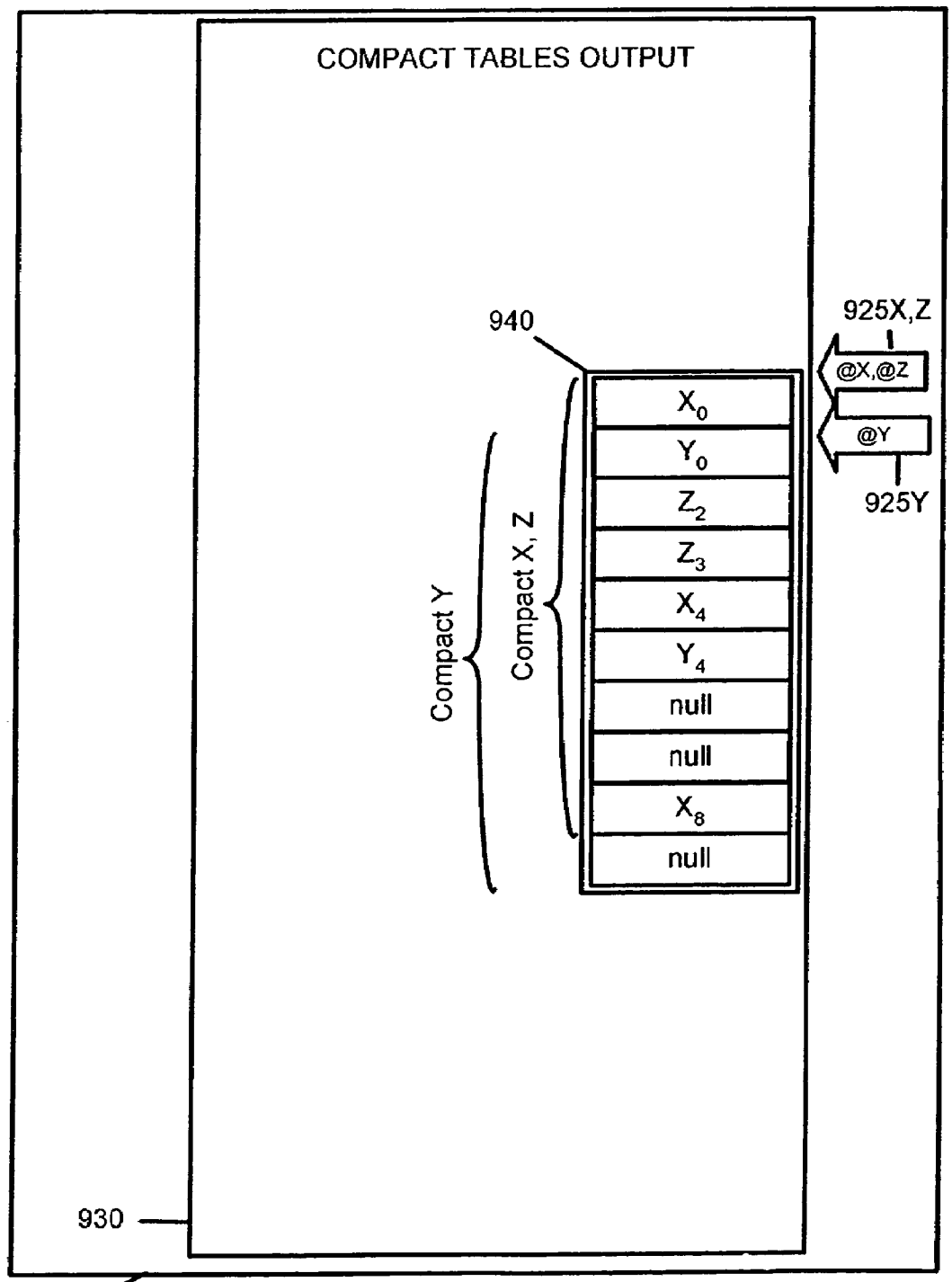
FIG. 30 illustrates the same table information found in FIG. 29 but compacted by the method of FIG. 28.

A method of compacting sparse CID tables in accordance with the optional step 800 of FIG. 17, will be described next with reference to FIG. 28. After which, in order to better illustrate this method, FIGS. 29 and 30 will be described. FIG. 29 illustrates sparse tables. FIG. 30 illustrates the same table information found in FIG. 29 compacted by the method of FIG. 28.

Figure 28:
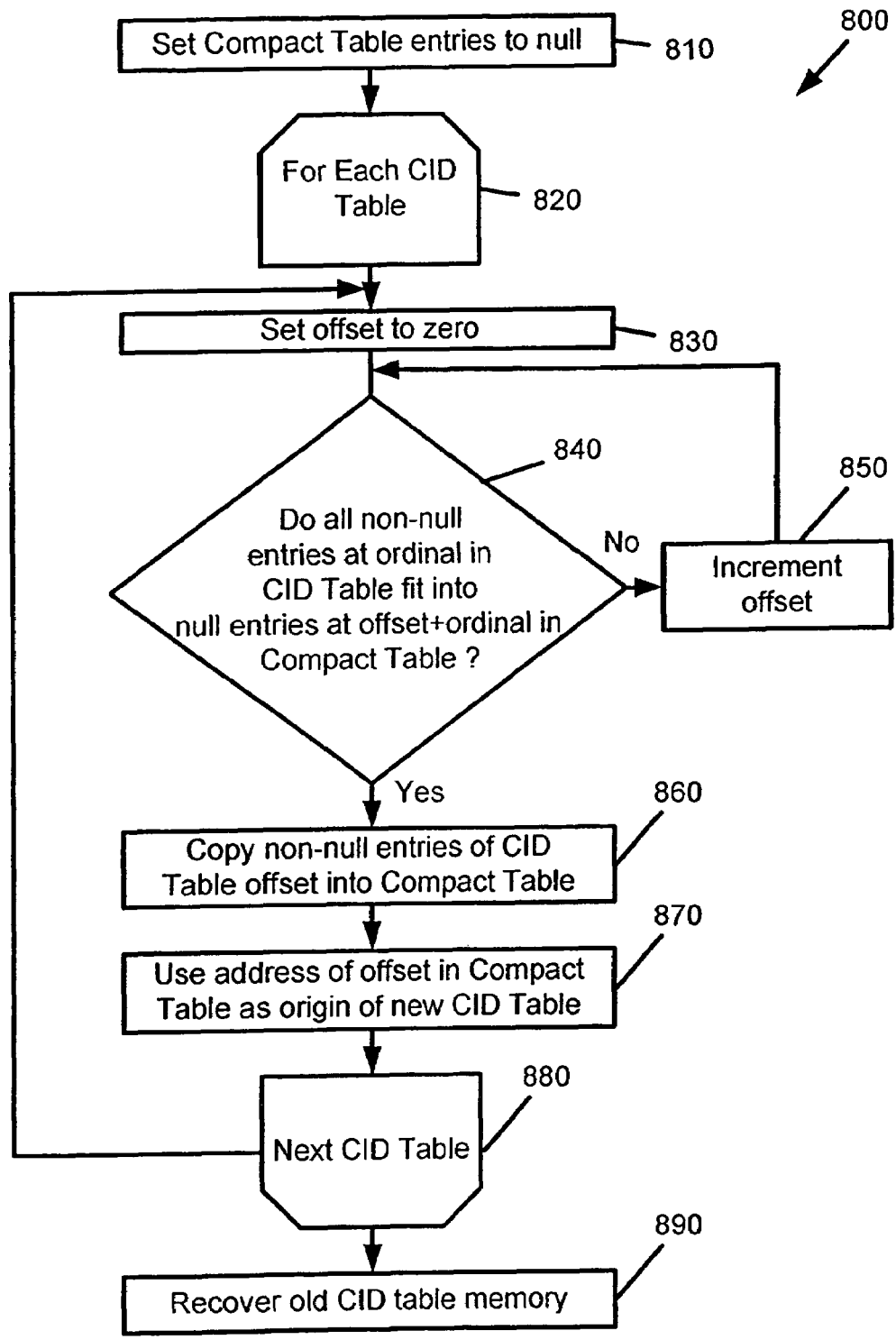
FIG. 28 illustrates an embodiment of a method of compacting sparse CID tables in accordance with the optional step 800 of FIG. 17.

With reference to FIG. 28, at step 810 a Compact Table is allocated and all of its entries are set to null. The Compact Table can be allocated to accommodate as many entries as there are in all of the candidate sparse CID tables. For instance, if each of 3 candidate CID tables has 9 entries each corresponding to 9 ordinals (0 to 8), then the Compact Table can be allocated to have 27 (3×9) entries. The method will actually use less memory than was allocated, therefore step 890 is provided to recover unused memory, both in the Compact Table and in the CID tables, at the end of the method.

At step 820, each candidate sparse CID table is processed in turn through steps 830 to 870.

At step 830, an offset value is set to zero. The offset value indicates how many entries of the Compact Table should be skipped in order to find the first entry of the sparse CID table being processed at step 820.

At step 840, all entries of the candidate sparse CID table are compared to the corresponding entries in the Compact Table in order to determine if the candidate sparse CID table would fit at the current offset. For a given offset, correspondence between candidate sparse CID table entries and Compact Table entries is done by adding the ordinal number of the CID table entry to the offset of the Compact Table. A candidate sparse CID table fits at a given offset if and only if all non-null entries at ordinal position in the candidate sparse CID table find correspondence with null entries at position [offset+ ordinal] in the Compact Table. If the candidate sparse table fits, then steps 860 and 870 ensue, or else step 850 ensues wherein the offset is incremented, and step 840 is performed again. Eventually, the offset will be sufficiently large so that step 840 determines that the candidate sparse table fits.

At step 860, the non-null entries in the candidate sparse CID table are copied to their corresponding position in the Compact Table.

At step 870, the address of the offset in the Compact Table is used as the new origin of the candidate sparse CID table, for example by setting the handle in memory which previously pointed to the address of the first entry in the candidate sparse CID table to point to the address of the offset entry in the Compact Table. Once step 870 is complete, the memory that was at the old candidate sparse CID table can be recovered or marked for recovery.

At step 880, the next candidate sparse CID table is processed through steps 830 to 870, or having processed all sparse CID tables, the method continues at step 890.

At step 890, memory that remains unused can be recovered. For instance, the memory of each candidate sparse CID table marked for recovery at step 870 can be recovered. Furthermore, all null entries at the end of the Compact Table can be recovered.

With reference to FIGS. 29 and 30, the equivalence of the compact representation of FIG. 30 with the sparse representation of FIG. 29 will be described with reference to the steps of the method at FIGS. 20-22.

With reference to FIG. 29, three sparse CID tables are shown: 920X, 920Y and 920Z that collectively form the sparse table input 910 for the method of FIG. 28. A sparse CID table has non-null entries, and being sparse, null entries. Table 920X has three non-null entries $X_0$, $X_4$ and $X_8$ at ordinal positions 0, 4 and 8 respectively. Table 920Y has two non-null entries $Y_0$ and $Y_5$ at ordinal positions 0 and 5 respectively. Table 920Z has two non-null entries $Z_2$ and $Z_4$ at ordinal positions 2 and 4 respectively. Each CID table 920X, 920Y, and 920Z has a handle 925X, 925Y and 925Z respectively which points to the address of the first entry of the respective CID table. The sparse table input 910 resides in either storage or media 900.

With reference to FIG. 30, the same sparse CID table information is shown, i.e., every non-null entry of the sparse table input 910 of FIG. 29 can be found in the compact tables output 930 of FIG. 30. Furthermore, so long as only non-null entries are accessed using the updated handles 925X, 925Z and 925Y, then compact table 940 provides a compact representation of the sparse CID tables of FIG. 29.

With reference back to FIGS. 20-22, step 353 of FIG. 22 could equally well use the tables of FIG. 29 or FIG. 30 to provide non-null entry ordinal$_m$(m$_m$). This is because the direct check step 334 of FIG. 21 prevents the direct dispatch step 353 of FIG. 22 from accessing non-null CID table entries by throwing an exception at step 336.

Having described in detail the preferred embodiments of the present invention, including the preferred methods of operation, it is to be understood that this operation could be carried out with different elements and steps. This preferred embodiment is presented only by way of example and is not meant to limit the scope of the present invention. As an illustration, the methods and systems disclosed herein are well suited for use in many wireless devices, such as personal digital assistants, mobile communication devices, cellular phones, and wireless two-way communication devices. Moreover, the methods and systems disclosed herein are useful in any device that uses an object-oriented computer system as well as can be implemented via compiler systems, computer-readable media, and runtime devices. The systems and methods may also have their information stored in data structures which are contained in memory as well as be transmitted via data signals embodied on carrier signals or other communication pathway media (e.g., fiber optics, infrared, etc.).

It is claimed:

1. A method for handling runtime objects operating on a wireless device, wherein the runtime objects are instantiations of classes, wherein a class can implement an object-oriented interface having methods, comprising the steps of:

assigning, for a class, an interface ordinal to an interface based upon a relationship existing between the class and the interface;

generating a class interface check table for the class by associating with at least one interface ordinal a reference that points to an interface implemented by a class, wherein more than one interface may share the same interface ordinal in order to minimize the number of interface ordinals;

assigning, for a class, a method ordinal to an interface's method based upon a relationship existing between the class and the method, wherein more than one method may share the same method ordinal in order to minimize the number of method ordinals;

generating a class interface dispatch table for the class by associating with at least one method ordinal a reference that points to a method of an interface, wherein the generated class interface dispatch table is sparse and;

generating a compact dispatch table by merging non-null entries of the class interface dispatch tables at ordinal positions into the compact dispatch table;

wherein an assigned interface ordinal and an associated reference stored in the class interface check table are used to check whether a runtime object operating on the wireless device is an instantiation of an interface and;

wherein an assigned method ordinal and an associated method reference stored in the compact dispatch table are used to perform a dispatch of an interface's method implemented by the runtime object.

2. The method of claim 1, wherein a direct interface check is performed by performing steps comprising:

providing class data for the runtime object in order to determine what class type provided the constructor for the runtime object and;

using the interface ordinals' association with the interface references to check whether the runtime object is an instance of an interface;

wherein the interface allows multiple inheritance to occur without multiple inheritance of implementation.

3. The method of claim 1, wherein a dispatch is performed by performing steps comprising:

providing class data for the runtime object in order to determine what class type provided the constructor for the runtime object;

using the method ordinals association with the method references to directly dispatch the method.

4. The method of claim 1, wherein a compiler system generates check and dispatch information based upon an input set of classes and set of interfaces, wherein the check and dispatch information includes the interface ordinals, the interface references associated with the interface ordinals, the method ordinals, and the method references associated with the method ordinals, wherein the wireless device includes runtime storage to store on the wireless device the assigned interface ordinals and their associated interface references.

5. The method of claim 4, wherein the runtime storage stores on the wireless device the assigned method ordinals and their associated method references.

6. The method of claim 5, wherein the runtime storage comprises runtime context which includes objects for which a direct check is performed and includes method calls on objects for which a direct dispatch is performed.

7. The method of claim 6, wherein the wireless device includes a runtime processor and operates within a Java-based computer environment, wherein an assigned interface ordinal and an associated reference are to be used by the runtime processor to check whether a runtime object operating on the wireless device is an instantiation of an interface;

wherein an assigned method ordinal and an associated method reference are to be used by the runtime processor to perform a dispatch of an interface's method implemented by the runtime object.

8. The method of claim 7, wherein a method call on the wireless device is used as a trigger to invoke a direct check and direct dispatch using the check and dispatch information.

9. A system for handling runtime objects operating on a wireless device, wherein the runtime objects are instantiations of classes, wherein a class can implement an object-oriented interface having methods, comprising:

a computer-readable storage medium for storing a class interface check data structure, wherein the class interface check data structure stores associations between interface ordinals and references to interfaces, wherein the ordinals are assigned to interfaces such that a first constraint is substantially satisfied, wherein the first constraint provides that two interfaces are assigned different interface ordinals if there exists a class that implements both of the interfaces;

said computer-readable storage medium storing a compact class interface dispatch data structure, wherein the compact class interface dispatch data structure stores associations between method ordinals and references to methods, wherein the ordinals are assigned to methods such that a second constraint is substantially satisfied, wherein the second constraint provides that two methods have different method ordinals if there exists a class that implements both of the methods;

wherein a compact class interface dispatch data structure is generated by merging the class interface dispatch data structures of a plurality of classes, each storing associations between method ordinals and references to methods implemented by the respective class, so that non-null entries of the class interface dispatch data structures at ordinal position fit into the compact class interface dispatch data structure;

wherein the class interface check data structure is used to check whether a runtime object operating on the wireless device is an instantiation of an interface;

wherein the compact class interface dispatch data structure is used to perform a dispatch of an interface's method implemented by the runtime object.

10. The system of claim 9 further comprising:

a compiler system that assigns the ordinals to interfaces such that the first constraint is substantially satisfied, wherein the compiler assigns the ordinals to method such that the second constraint is substantially satisfied.

* * * * *

UNITED STATES PATENT AND TRADEMARK OFFICE
CERTIFICATE OF CORRECTION

| | | |
|---|---|---|
| PATENT NO. | : 7,478,409 B2 | Page 1 of 1 |
| APPLICATION NO. | : 10/510071 | |
| DATED | : January 13, 2009 | |
| INVENTOR(S) | : Anthony F. Scian and David P. Yach | |

It is certified that error appears in the above-identified patent and that said Letters Patent is hereby corrected as shown below:

Column 12, Lines 18 and 19, "are used" should read -- are to be used --.

Column 12, Line 23, "are used" should read -- are to be used --.

Column 14, Line 16, "is used" should read -- is to be used --.

Signed and Sealed this

Twenty-eighth Day of April, 2009

JOHN DOLL
*Acting Director of the United States Patent and Trademark Office*